United States Patent
Sasaki et al.

(10) Patent No.: US 8,427,781 B1
(45) Date of Patent: Apr. 23, 2013

(54) MAGNETIC HEAD FOR PERPENDICULAR MAGNETIC RECORDING HAVING A MAIN POLE AND A SHIELD

(75) Inventors: Yoshitaka Sasaki, Santa Clara, CA (US); Hiroyuki Ito, Milpitas, CA (US); Kazuki Sato, Milpitas, CA (US); Hironori Araki, Milpitas, CA (US); Shigeki Tanemura, Milpitas, CA (US); Tatsuya Shimizu, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/569,682

(22) Filed: Aug. 8, 2012

(51) Int. Cl.
  *G11B 5/147* (2006.01)
(52) U.S. Cl.
  USPC .......................... 360/125.13; 360/125.15
(58) Field of Classification Search ............ 360/125.1, 360/125.11, 125.13, 125.14, 125.15, 125.16
  See application file for complete search history.

(56) References Cited

U.S. PATENT DOCUMENTS

| | | | |
|---|---|---|---|
| 8,194,510 B2 * | 6/2012 | Sasaki et al. | 369/13.33 |
| 8,233,235 B2 * | 7/2012 | Chen et al. | 360/125.15 |
| 8,274,759 B1 * | 9/2012 | Sasaki et al. | 360/125.13 |
| 8,295,008 B1 * | 10/2012 | Sasaki et al. | 360/125.02 |
| 8,323,727 B2 * | 12/2012 | Pentek et al. | 427/129 |
| 8,345,381 B1 * | 1/2013 | Sasaki et al. | 360/123.03 |
| 8,345,384 B1 * | 1/2013 | Sasaki et al. | 360/125.15 |
| 2004/0150910 A1 | 8/2004 | Okada et al. | |
| 2009/0059426 A1 | 3/2009 | Sasaki et al. | |

\* cited by examiner

*Primary Examiner* — Brian Miller
(74) *Attorney, Agent, or Firm* — Oliff & Berridge, PLC

(57) ABSTRACT

A magnetic head with a main pole is provided. The main pole has a bottom end including an inclined portion. A write shield has a first inclined surface opposed to the inclined portion and has a second inclined surface that is located farther from a medium facing surface than is the first inclined surface. The first inclined surface has a first end located in the medium facing surface and a second end opposite thereto. The second inclined surface has a third end connected to the second end and a fourth end opposite thereto. The second inclined surface forms a greater angle than does the first inclined surface relative to a direction perpendicular to the medium facing surface. The distance between the main pole and an arbitrary point on the second inclined surface increases with decreasing distance between the arbitrary point and the fourth end.

9 Claims, 31 Drawing Sheets

MAGNETIC HEAD FOR PERPENDICULAR MAGNETIC RECORDING HAVING A MAIN POLE AND A SHIELD

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a main pole and a shield.

2. Description of Related Art

The recording systems of magnetic read/write apparatuses include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head section having a magnetoresistive element (hereinafter, also referred to as MR element) for reading and a write head section having an induction-type electromagnetic transducer for writing are stacked on the top surface of a substrate. The write head section includes a main pole that produces a write magnetic field in the direction perpendicular to the plane of a recording medium. The main pole includes, for example, a track width defining portion having an end located in a medium facing surface that faces a recording medium, and a wide portion that is connected to the other end of the track width defining portion and is greater in width than the track width defining portion. The track width defining portion has a generally constant width. To achieve higher recording density, it is required that the write head section of the perpendicular magnetic recording system be smaller in track width and improved in write characteristics such as overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of a recording medium by means of an airflow that comes from the air inflow end into the space between the medium facing surface and the recording medium.

Here, the side of positions closer to the leading end relative to a reference position will be defined as the leading side, and the side of positions closer to the trailing end relative to the reference position will be defined as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erasure). For achieving higher recording density, it is necessary to prevent adjacent track erasure.

A known technique for preventing adjacent track erasure induced by a skew is to configure the main pole so that its end face located in the medium facing surface decreases in width with increasing proximity to the top surface of the substrate, as disclosed in U.S. Patent Application Publication Nos. US 2004/0150910 A1 and US 2009/0059426 A1, for example. U.S. Patent Application Publication Nos. US 2004/0150910 A1 and US 2009/0059426 A1 also disclose configuring the main pole so that its thickness in the vicinity of the medium facing surface decreases with increasing proximity to the medium facing surface.

In order to prevent the problems induced by a skew, it is also effective to reduce the thickness of the main pole in the medium facing surface. If the entire main pole is thinned, however, the main pole becomes small in cross-sectional area perpendicular to the direction in which magnetic flux flows. This makes it difficult for the main pole to direct much magnetic flux to the medium facing surface, thus leading to degradation of overwrite property.

Configuring the main pole so that its thickness in the vicinity of the medium facing surface decreases with increasing proximity to the medium facing surface as disclosed in U.S. Patent Application Publication Nos. US 2004/0150910 A1 and US 2009/0059426 A1 allows the main pole to be small in thickness in the medium facing surface and allows part of the main pole away from the medium facing surface to be large in thickness, thereby making it possible for the main pole to direct much magnetic flux to the medium facing surface.

In order to prevent adjacent track erasure induced by a skew and provide higher recording density, it is effective to provide a write shield having an end face that is located in the medium facing surface at a position on the front side in the direction of travel of the recording medium relative to the end face of the main pole, as disclosed in U.S. Patent Application Publication No. US 2009/0059426 A1.

In view of the foregoing, in order to prevent adjacent track erasure induced by a skew and provide higher recording density, the magnetic head can conceivably be configured so that at least one of part of the top surface of the main pole in the vicinity of the medium facing surface and part of the bottom end of the main pole in the vicinity of the medium facing surface is formed into an inclined portion that is inclined relative to a direction perpendicular to the medium facing surface, and the write shield is provided with an inclined surface opposed to this inclined portion.

The above-described configuration, however, has a problem in that where the inclined portion of the main pole and the inclined surface of the write shield are opposed to each other over a large area with a small spacing therebetween, magnetic flux leakage from the main pole to the write shield increases to cause degradation of write characteristics such as the overwrite property.

To avoid this, the inclined surface may be reduced in length in the direction perpendicular to the medium facing surface. This, however, would result in a reduction in volume of the write shield and thereby compromise the function of the write shield. More specifically, a reduction in volume of the write shield is likely to cause magnetic flux saturation in the write shield. This in turn causes magnetic flux leakage from the write shield toward the medium facing surface, and thus raises a problem that the magnetic flux leakage may result in accidental erasure of data stored on the recording medium.

It has thus been difficult for a conventional magnetic head including a write shield to prevent the skew-induced problems and provide improved write characteristics without compromising the function of the write shield.

OBJECT AND SUMMARY OF THE INVENTION

It is an object of the present invention to provide a magnetic head for perpendicular magnetic recording that is capable of preventing the skew-induced problems and providing improved write characteristics without compromising the function of the write shield.

A magnetic head for perpendicular magnetic recording of the present invention includes: a medium facing surface that faces a recording medium; a coil; a main pole; a write shield made of a magnetic material; and a gap part made of a nonmagnetic material. The coil produces a magnetic field corresponding to data to be written on the recording medium. The main pole has an end face located in the medium facing surface. The main pole allows a magnetic flux corresponding to the magnetic field produced by the coil to pass, and produces a write magnetic field for writing the data on the recording medium by means of a perpendicular magnetic recording system. The write shield has an end face located in the medium facing surface. The gap part is interposed between the main pole and the write shield.

The end face of the write shield includes a first end face portion that is located on the front side in the direction of travel of the recording medium relative to the end face of the main pole. The main pole has a top surface, and a bottom end opposite to the top surface, the top surface being a surface located at an end on the front side in the direction of travel of the recording medium. At least one of the top surface and the bottom end of the main pole includes an inclined portion. The inclined portion has a front end located in the medium facing surface and a rear end opposite to the front end.

A first virtual plane and a second virtual plane are assumed for the magnetic head for perpendicular magnetic recording of the present invention. The first virtual plane passes through an end of the end face of the main pole located on the front side in the direction of travel of the recording medium and is perpendicular to the medium facing surface and to the direction of travel of the recording medium. The second virtual plane passes through an end of the end face of the main pole located on the rear side in the direction of travel of the recording medium and is perpendicular to the medium facing surface and to the direction of travel of the recording medium. The inclined portion is inclined relative to the first and second virtual planes and the medium facing surface such that the rear end is located farther from the first and second virtual planes than is the front end.

The write shield has a first inclined surface that is opposed to the inclined portion with the gap part interposed therebetween, and a second inclined surface that is located farther from the medium facing surface than is the first inclined surface. The first inclined surface has a first end located in the medium facing surface and a second end opposite to the first end. The first inclined surface is inclined relative to the first and second virtual planes and the medium facing surface such that the second end is located farther from the first and second virtual planes than is the first end. The second inclined surface has a third end connected to the second end and a fourth end opposite to the third end. The second inclined surface is inclined relative to the first and second virtual planes and the medium facing surface such that the fourth end is located farther from the first and second virtual planes than is the third end. The angle that the second inclined surface forms relative to a direction perpendicular to the medium facing surface is greater than the angle that the first inclined surface forms relative to the direction perpendicular to the medium facing surface. The distance between the main pole and an arbitrary point on the second inclined surface increases with decreasing distance between the arbitrary point and the fourth end.

In the magnetic head for perpendicular magnetic recording of the present invention, the angle that the first inclined surface forms relative to the direction perpendicular to the medium facing surface may fall within the range of 30° to 45°, and the angle that the second inclined surface forms relative to the direction perpendicular to the medium facing surface may fall within the range of 50° to 65°.

In the magnetic head for perpendicular magnetic recording of the present invention, the bottom end of the main pole may include the inclined portion, and the end face of the write shield may further include a second end face portion that is located on the rear side in the direction of travel of the recording medium relative to the end face of the main pole. In this case, the magnetic head may further include a return path section made of a magnetic material. The return path section is located on the rear side in the direction of travel of the recording medium relative to the main pole, and connects the write shield and part of the main pole away from the medium facing surface to each other so that a space is defined by the main pole, the gap part, the write shield, and the return path section. The coil may include a portion passing through the space.

In the magnetic head for perpendicular magnetic recording of the present invention, the top surface of the main pole may include the inclined portion. In this case, the magnetic head may further include a return path section made of a magnetic material. The return path section is located on the front side in the direction of travel of the recording medium relative to the main pole, and connects the write shield and part of the main pole away from the medium facing surface to each other so that a space is defined by the main pole, the gap part, the write shield, and the return path section. The coil may include a portion passing through the space.

In the magnetic head for perpendicular magnetic recording of the present invention, each of the bottom end and the top surface of the main pole may include the inclined portion, and the end face of the write shield may further include a second end face portion that is located on the rear side in the direction of travel of the recording medium relative to the end face of the main pole. In this case, the magnetic head may further include a first return path section and a second return path section each made of a magnetic material. The first return path section is located on the rear side in the direction of travel of the recording medium relative to the main pole, and connects the write shield and part of the main pole away from the medium facing surface to each other so that a first space is defined by the main pole, the gap part, the write shield, and the first return path section. The second return path section is located on the front side in the direction of travel of the recording medium relative to the main pole, and connects the write shield and part of the main pole away from the medium facing surface to each other so that a second space is defined by the main pole, the gap part, the write shield, and the second return path section. The coil may include a first portion passing through the first space and a second portion passing through the second space.

In the magnetic head for perpendicular magnetic recording of the present invention, the end face of the write shield may further include a second, a third, and a fourth end face portion. The second end face portion is located on the rear side in the direction of travel of the recording medium relative to the end face of the main pole. The third and fourth end face portions are located on opposite sides of the end face of the main pole in the track width direction.

In the magnetic head for perpendicular magnetic recording of the present invention, the angle that the second inclined surface forms relative to the direction perpendicular to the medium facing surface is greater than the angle that the first inclined surface forms relative to the direction perpendicular to the medium facing surface. Further, the distance between the main pole and an arbitrary point on the second inclined surface increases with decreasing distance between the arbitrary point and the fourth end. These features make it possible to prevent magnetic flux leakage from the main pole to the write shield while preventing magnetic flux saturation in the write shield. Consequently, according to the present invention, it is possible to prevent the skew-induced problems and provide improved write characteristics without compromising the function of the write shield.

Other objects, features and advantages of the present invention will become fully apparent from the following description.

DETAILED DESCRIPTION OF THE PREFERRED EMBODIMENTS

First Embodiment

Figure 1:
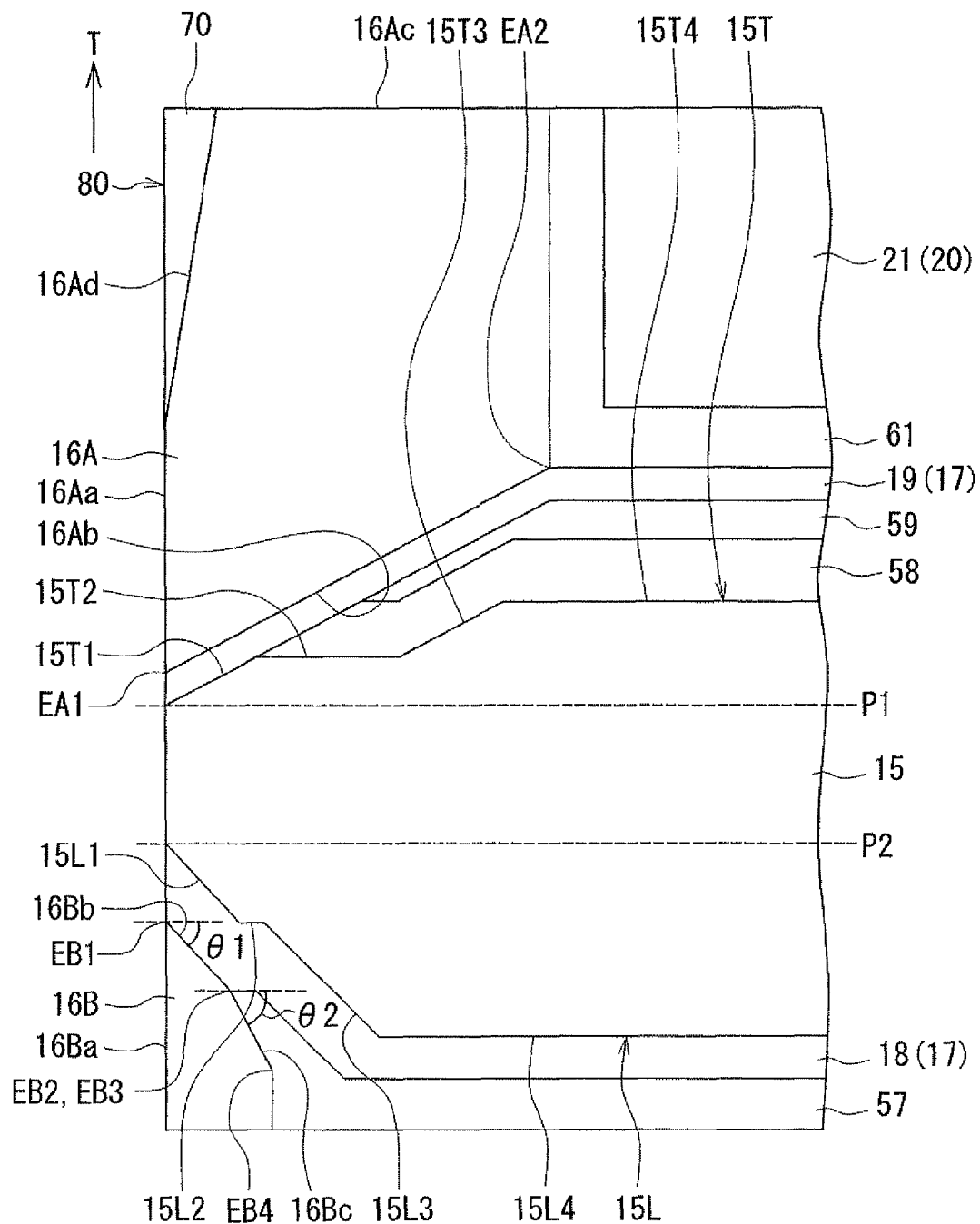
FIG. 1 is a cross-sectional view showing a write shield and a portion of a main pole in the vicinity of the medium facing surface in a magnetic head according to a first embodiment of the invention.
Figure 2:
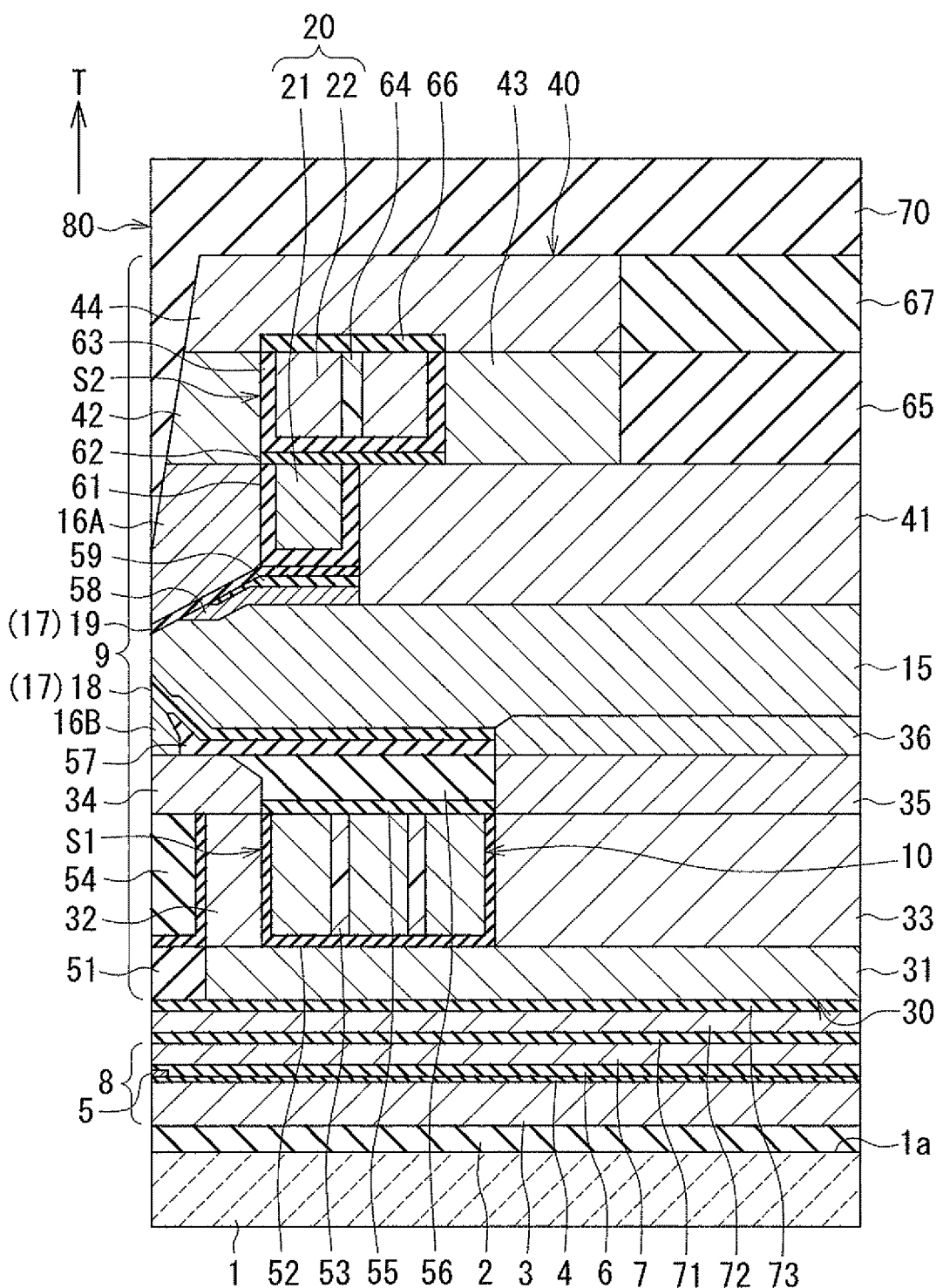
FIG. 2 is a cross-sectional view of the magnetic head according to the first embodiment of the invention.
Figure 3:
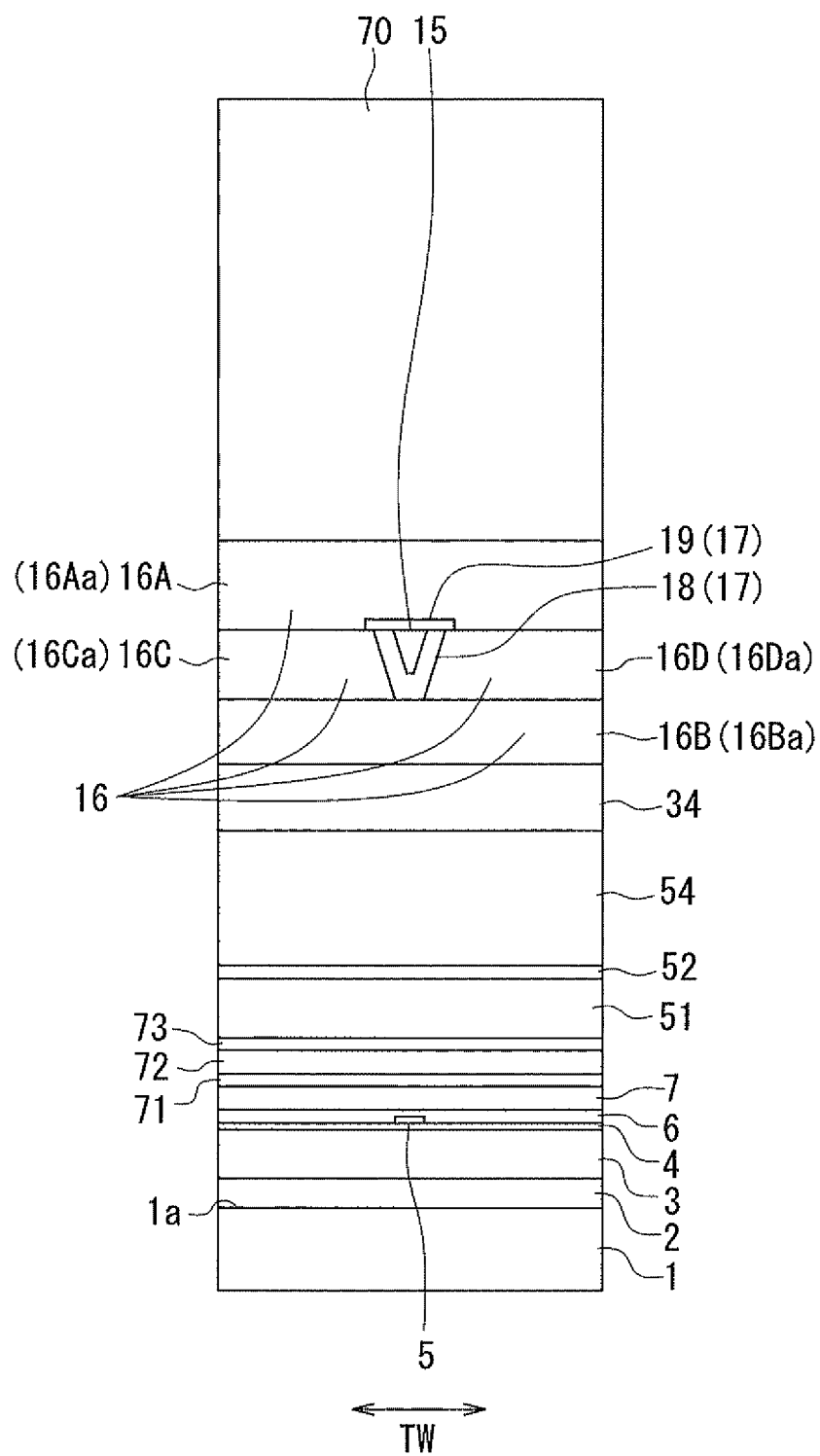
FIG. 3 is a front view showing the medium facing surface of the magnetic head according to the first embodiment of the invention.
Figure 4:
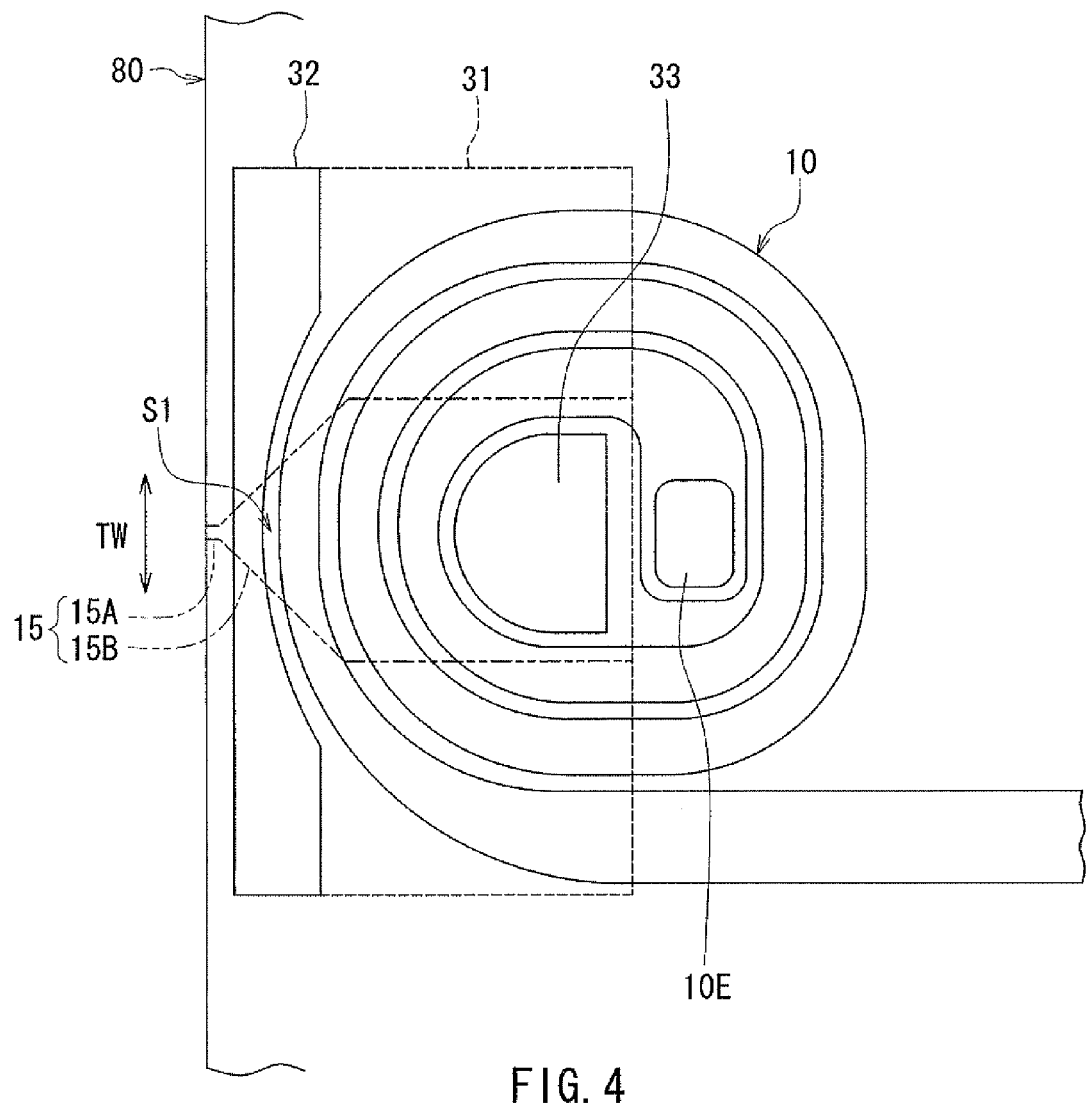
FIG. 4 is a plan view showing a first portion of a coil of the magnetic head according to the first embodiment of the invention.
Figure 5:
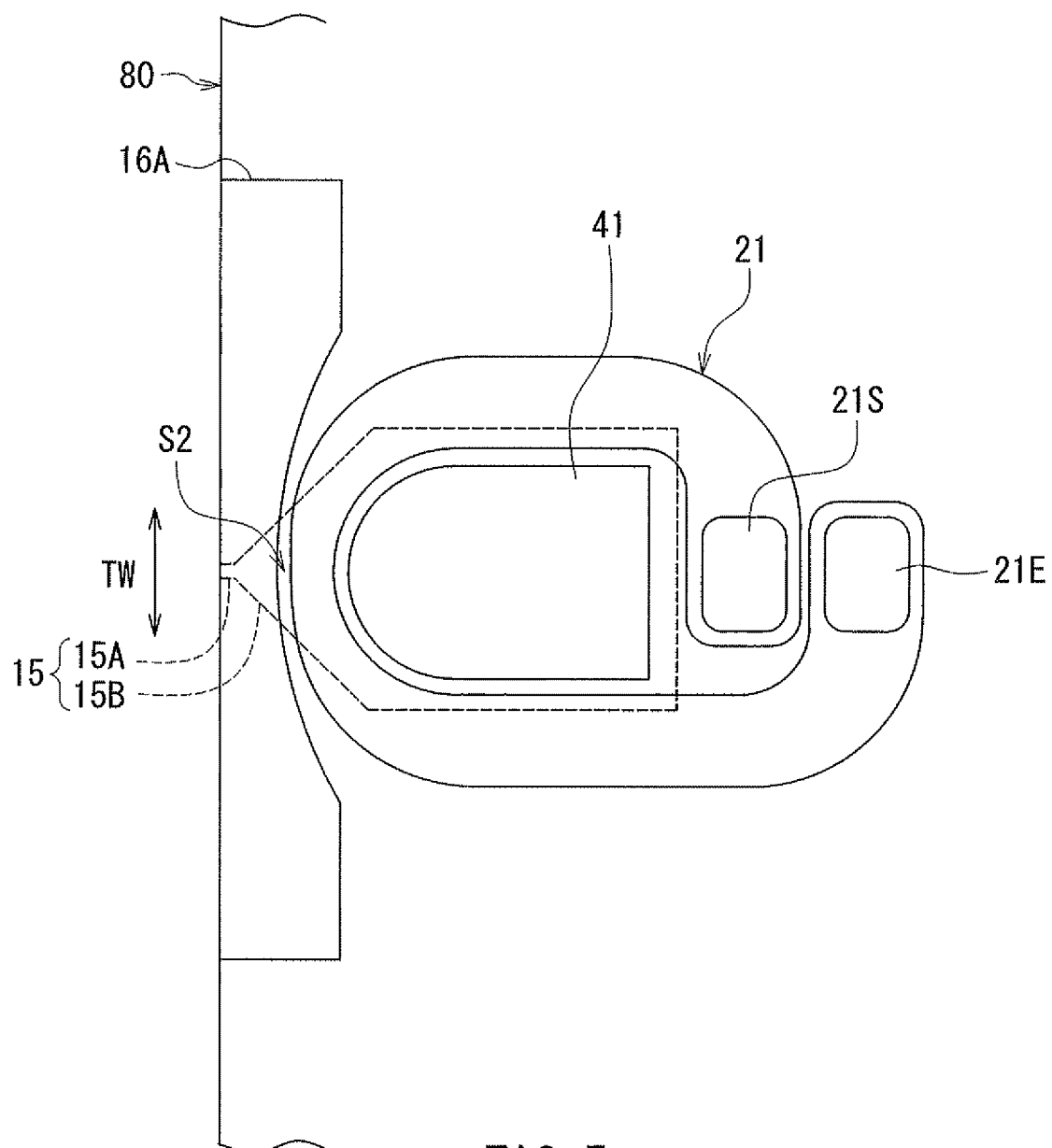
FIG. 5 is a plan view showing a first layer of a second portion of the coil of the magnetic head according to the first embodiment of the invention.
Figure 6:
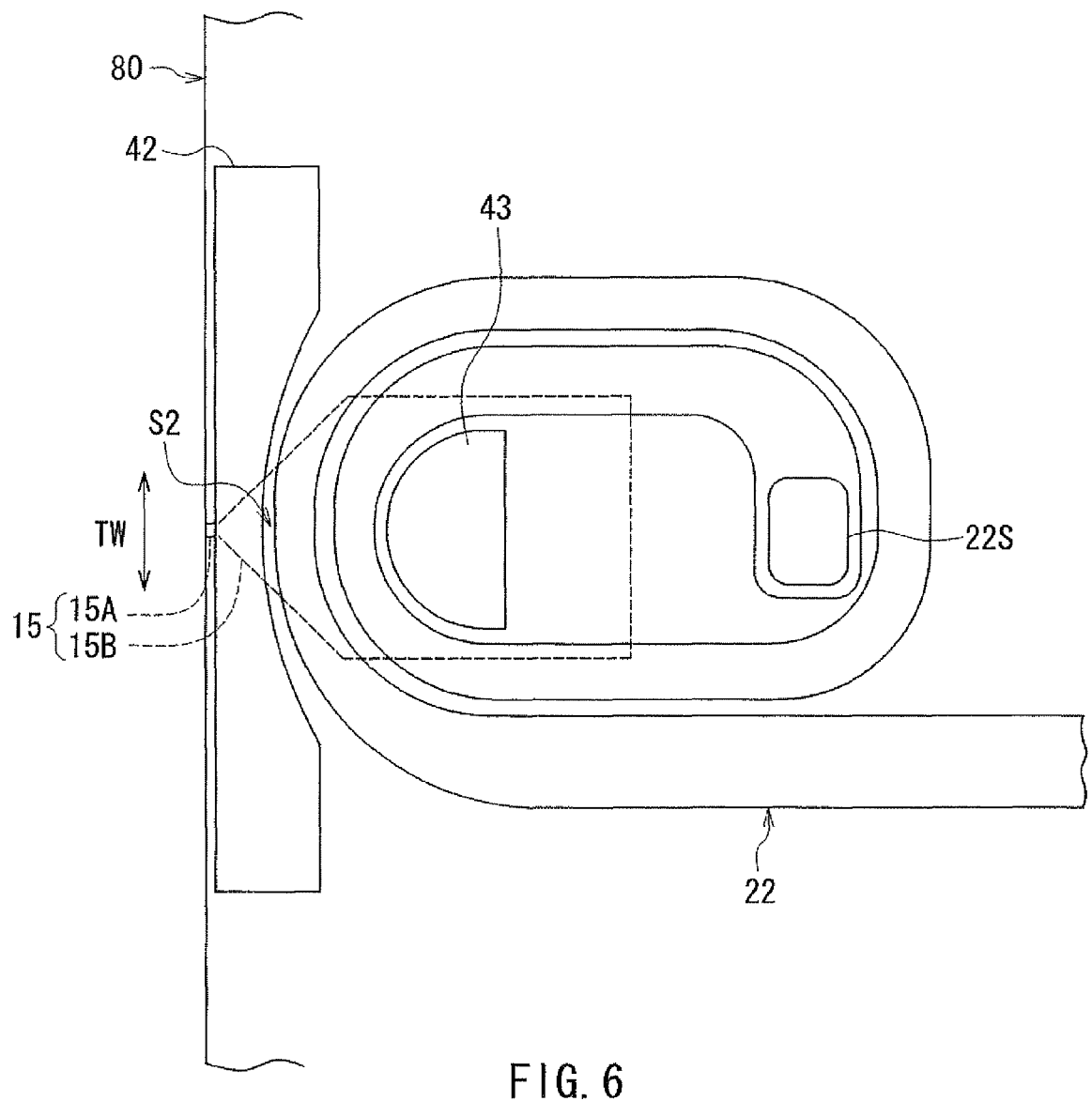
FIG. 6 is a plan view showing a second layer of the second portion of the coil of the magnetic head according to the first embodiment of the invention.

Embodiments of the present invention will now be described in detail with reference to the drawings. First, reference is made to FIG. 1 to FIG. 6 to describe the configuration of a magnetic head according to a first embodiment of the invention. FIG. 1 is a cross-sectional view showing a write shield and a portion of a main pole in the vicinity of the medium facing surface in the magnetic head according to the present embodiment. FIG. 2 is a cross-sectional view of the magnetic head according to the present embodiment. The arrows with the symbol T in FIG. 1 and FIG. 2 indicate the direction of travel of a recording medium. FIG. 3 is a front view showing the medium facing surface of the magnetic head according to the present embodiment. FIG. 4 is a plan view showing a first portion of a coil of the magnetic head according to the present embodiment. FIG. 5 is a plan view showing a first layer of a second portion of the coil of the magnetic head according to the present embodiment. FIG. 6 is a plan view showing a second layer of the second portion of the coil of the magnetic head according to the present embodiment. The arrows with the symbol TW in FIG. 3 to FIG. 6 indicate the track width direction.

As shown in FIG. 2 and FIG. 3, the magnetic head for perpendicular magnetic recording (hereinafter simply referred to as the magnetic head) according to the present embodiment includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a first read shield layer 3 made of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 made of a magnetic material and disposed on the second read shield gap film 6.

An end of the MR element 5 is located in a medium facing surface 80 that faces a recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head section 8. The magnetic head further includes: a nonmagnetic layer 71 made of a nonmagnetic material and disposed on the second read shield layer 7; a middle shield layer 72 made of a magnetic material and disposed on the nonmagnetic layer 71; a nonmagnetic layer 73 made of a nonmagnetic material and disposed on the middle shield layer 72; and a write head section 9 disposed on the nonmagnetic layer 73. The middle shield layer 72 has the function of shielding the MR element 5 from magnetic fields generated in the write head section 9. The nonmagnetic layers 71 and 73 are made of alumina, for example. The write head section 9 includes a coil, a main pole 15, a write shield 16, and a gap part 17.

The coil produces a magnetic field corresponding to data to be written on a recording medium. The coil includes a first portion 10 and a second portion 20. The first portion 10 and the second portion 20 are both made of a conductive material such as copper. The first portion 10 and the second portion 20 are connected in series or in parallel. The main pole 15 has an end face located in the medium facing surface 80. The main pole 15 allows a magnetic flux corresponding to the magnetic field produced by the coil to pass, and produces a write magnetic field for writing data on a recording medium by means of a perpendicular magnetic recording system. FIG. 1 and FIG. 2 each show a cross section that intersects the end face of the main pole 15 located in the medium facing surface 80 and that is perpendicular to the medium facing surface 80 and to the top surface 1a of the substrate 1 (this cross section will hereinafter be referred to as the main cross section).

The write shield 16 has an end face located in the medium facing surface 80. The end face of the write shield 16 includes first to fourth end face portions 16Aa, 16Ba, 16Ca, and 16Da. The first end face portion 16Aa is located on the front side in the direction T of travel of the recording medium relative to the end face of the main pole 15. The second end face portion 16Ba is located on the rear side in the direction T of travel of the recording medium relative to the end face of the main pole 15. The third and fourth end face portions 16Ca and 16Da are located on opposite sides of the end face of the main pole 15 in the track width direction TW. In the medium facing surface 80, the first to fourth end face portions 16Aa, 16Ba, 16Ca, and 16Da are arranged to wrap around the end face of the main pole 15.

The write shield 16 is made of a magnetic material. The material employed for the write shield 16 may be CoFeN, CoNiFe, NiFe, or CoFe, for example.

The write head section 9 further includes a first return path section 30 and a second return path section 40. The first and second return path sections 30 and 40 are each made of a magnetic material. The material employed for each of the first and second return path sections 30 and 40 may be CoFeN, CoNiFe, NiFe, or CoFe, for example. The first return path section 30 and the second return path section 40 align along a direction perpendicular to the top surface 1a of the substrate 1 with the main pole 15 interposed therebetween. The first return path section 30 is located on the rear side in the direction T of travel of the recording medium relative to the main pole 15, and connects the write shield 16 and part of the main pole 15 away from the medium facing surface 80 to each other, thereby magnetically coupling the write shield 16 and the main pole 15 to each other. The second return path section 40 is located on the front side in the direction T of travel of the recording medium relative to the main pole 15, and connects the write shield 16 and part of the main pole 15 away from the medium facing surface 80 to each other, thereby magnetically coupling the write shield 16 and the main pole 15 to each other.

The first return path section 30 includes magnetic layers 31, 32, 33, 34, 35, and 36. The magnetic layer 31 is located on the nonmagnetic layer 73. The magnetic layers 32 and 33 are both located on the magnetic layer 31. The magnetic layer 32 is located near the medium facing surface 80. The magnetic layer 33 is located farther from the medium facing surface 80 than is the magnetic layer 32. The magnetic layers 31 and 32 have their respective end faces facing toward the medium facing surface 80, the end faces being located at a distance from the medium facing surface 80. As shown in FIG. 4, the first portion 10 of the coil is wound approximately three turns around the magnetic layer 33.

The magnetic head further includes: an insulating layer 51 made of an insulating material, disposed on the nonmagnetic layer 73 and surrounding the magnetic layer 31; an insulating film 52 made of an insulating material and interposed between the first portion 10 and the magnetic layers 31 to 33; an insulating layer 53 made of an insulating material and disposed in the space between adjacent turns of the first portion 10; and an insulating layer 54 made of an insulating material and disposed around the first portion 10 and the magnetic layer 32. The top surfaces of the first portion 10, the magnetic layers 32 and 33, the insulating film 52, and the insulating layers 53 and 54 are even with each other. The insulating layers 51 and 54 and the insulating film 52 are made of alumina, for example. The insulating layer 53 is made of photoresist, for example.

The magnetic layer 34 is disposed over the magnetic layer 32 and the insulating layer 54. The magnetic layer 34 has a front end face located in the medium facing surface 80, a rear end face opposite to the front end face, a top surface, and a connecting surface connecting the top surface and the rear end face to each other. The distance from the medium facing surface 80 to an arbitrary point on the connecting surface of the magnetic layer 34 decreases with increasing distance from the arbitrary point to the top surface 1a of the substrate 1.

The magnetic layer 35 is disposed on the magnetic layer 33. The magnetic head further includes an insulating layer 55 made of an insulating material and disposed over the top surfaces of the first portion 10, the insulating film 52 and the insulating layers 53 and 54, and an insulating layer 56 made of an insulating material, disposed on the insulating layer 55 and surrounding the magnetic layers 34 and 35. The top surfaces of the magnetic layers 34 and 35 and the insulating layer 56 are even with each other. The insulating layers 55 and 56 are made of alumina, for example.

As shown in FIG. 3, the write shield 16 includes a first shield 16A, a second shield 16B, and two side shields 16C and 16D. The two side shields 16C and 16D are located on opposite sides of the main pole 15 in the track width direction TW. The first shield 16A is located on the front side in the direction T of travel of the recording medium relative to the main pole 15. The second shield 16B is located on the rear side in the direction T of travel of the recording medium relative to the main pole 15. The side shields 16C and 16D magnetically couple the first shield 16A and the second shield 16B to each other.

As shown in FIG. 1 and FIG. 3, the first shield 16A has: the first end face portion 16Aa; a first inclined surface 16Ab which is a bottom surface; a top surface 16Ac; and a connecting surface 16Ad connecting the first end face portion 16Aa and the top surface 16Ac to each other. The distance from the medium facing surface 80 to an arbitrary point on the connecting surface 16Ad increases with increasing distance from the arbitrary point to the top surface 1a of the substrate 1. The second shield 16B has the second end face portion 16Ba, a first inclined surface 16Bb, and a second inclined surface 16Bc. The first and second inclined surfaces 16Bb and 16Bc face toward the main pole 15. The second inclined surface 16Bc is located farther from the medium facing surface 80 than is the first inclined surface 16Bb, and is contiguous with the first inclined surface 16Bb. The shapes and arrangement of the inclined surfaces 16Ab, 16Bb, and 16Bc will be described in detail later. As shown in FIG. 3, the side shield 16C has the third end face portion 16Ca. The side shield 16D has the fourth end face portion 16Da.

The second shield 16B is disposed on the magnetic layer 34. The magnetic layer 36 is disposed on the magnetic layer 35. The magnetic head further includes a nonmagnetic layer 57 made of a nonmagnetic material. The nonmagnetic layer 57 is disposed on part of the top surface of the magnetic layer 34 and on the top surface of the insulating layer 56, and surrounds the second shield 16B and the magnetic layer 36. As shown in FIG. 1, the top surface of the nonmagnetic layer 57 includes: a flat portion contiguous with the first inclined surface 16Bb of the second shield 16B; an inclined surface that is contiguous with the flat portion and is located farther from the medium facing surface 80 than is the flat portion; and a bottom portion that is contiguous with the inclined surface and is located farther from the medium facing surface 80 than is the inclined surface. The nonmagnetic layer 57 is made of alumina, for example.

The main pole 15 has a top surface 15T (see FIG. 1), which is a surface located at an end on the front side in the direction T of travel of the recording medium, and a bottom end 15L (see FIG. 1) opposite to the top surface 15T. The main pole 15 further has first and second side parts (see FIG. 3) that are opposite to each other in the track width direction TW. The side shield 16C has a first sidewall opposed to the first side part of the main pole 15. The side shield 16D has a second sidewall opposed to the second side part of the main pole 15.

The gap part 17 is interposed between the main pole 15 and the write shield 16. The magnetic head further includes a first gap layer 19 made of a nonmagnetic material and a second gap layer 18 made of a nonmagnetic material. A portion of the first gap layer 19 constitutes a portion of the gap part 17. A portion of the second gap layer 18 constitutes another portion of the gap part 17. The portion of the first gap layer 19 constituting the portion of the gap part 17 is located between the main pole 15 and the first shield 16A. The portion of the second gap layer 18 constituting the other portion of the gap part 17 is located between the main pole 15 and each of the second shield 16B and the side shields 16C and 16D.

The side shields 16C and 16D are disposed on the second shield 16B and in contact with the first inclined surface 16Bb of the second shield 16B. The second gap layer 18 is arranged to extend along the sidewalls of the side shields 16C and 16D, the first inclined surface 16Bb of the second shield 16B, and the top surface of the nonmagnetic layer 57. The nonmagnetic material employed to form the second gap layer 18 may be an insulating material or a nonmagnetic metal material. Alumina is an example of insulating materials that can be used to form the second gap layer 18. Ru is an example of nonmagnetic metal materials that can be used to form the second gap layer 18.

The main pole 15 is disposed over the second shield 16B and the nonmagnetic layer 57 such that the second gap layer 18 is interposed between the main pole 15 and each of the first inclined surface 16Bb of the second shield 16B and the top surface of the nonmagnetic layer 57. As shown in FIG. 3, the second gap layer 18 is interposed also between the main pole 15 and each of the side shields 16C and 16D.

The bottom end 15L of the main pole 15 is in contact with the top surface of the magnetic layer 36 at a position away from the medium facing surface 80. The main pole 15 is made of a magnetic metal material. The material employed for the main pole 15 may be NiFe, CoNiFe, or CoFe, for example. The shape of the main pole 15 will be described in detail later.

The magnetic head further includes a first nonmagnetic layer (not shown) made of a nonmagnetic material and disposed around the main pole 15 and the side shields 16C and 16D. In the present embodiment, the first nonmagnetic layer is particularly made of a nonmagnetic insulating material such as alumina.

The magnetic head further includes a nonmagnetic metal layer 58 made of a nonmagnetic metal material and disposed on part of the top surface 15T of the main pole 15 at a position away from the medium facing surface 80, and an insulating layer 59 made of an insulating material and disposed on the top surface of the nonmagnetic metal layer 58. The nonmagnetic metal layer 58 is made of Ru, NiCr, or NiCu, for example. The insulating layer 59 is made of alumina, for example.

The first gap layer 19 is disposed to cover the main pole 15, the nonmagnetic metal layer 58 and the insulating layer 59. The material employed for the first gap layer 19 may be a nonmagnetic insulating material such as alumina or a nonmagnetic conductive material such as Ru, NiCu, Ta, W, NiB, or NiP.

The first shield 16A is disposed over the side shields 16C and 16D and the first gap layer 19, and is in contact with the top surfaces of the side shields 16C and 16D and the first gap layer 19. In the medium facing surface 80, part of the first end face portion 16Aa of the first shield 16A is spaced from the end face of the main pole 15 by a predetermined distance created by the thickness of the first gap layer 19. The thickness of the first gap layer 19 preferably falls within the range of 5 to 60 nm, and may be 30 to 60 nm, for example. The end face of the main pole 15 has a side that is adjacent to the first gap layer 19, and the side defines the track width.

The second return path section 40 includes magnetic layers 41, 42, 43, and 44. The magnetic layer 41 is disposed on the main pole 15 at a position away from the medium facing surface 80.

The second portion 20 of the coil includes a first layer 21 and a second layer 22. As shown in FIG. 5, the first layer 21 is wound one turn around the magnetic layer 41. The magnetic head further includes an insulating film 61 made of an insulating material and interposed between the first layer 21 and each of the first shield 16A, the first gap layer 19 and the magnetic layer 41, and a second nonmagnetic layer (not shown) made of a nonmagnetic material and disposed around the first layer 21 and the first shield 16A. The insulating film 61 is made of alumina, for example. The second nonmagnetic layer is made of an inorganic insulating material, for example. The inorganic insulating material may be alumina or silicon oxide, for example. The top surfaces of the first shield 16A, the first layer 21, the magnetic layer 41, the insulating film 61, and the second nonmagnetic layer are even with each other.

The magnetic head further includes an insulating layer 62 made of an insulating material and disposed over the top surfaces of the first layer 21 and the insulating film 61 and part of the top surface of the magnetic layer 41. The insulating layer 62 is made of alumina, for example.

The magnetic layer 42 is disposed on the first shield 16A. The magnetic layer 42 has an end face facing toward the medium facing surface 80, the end face being located at a distance from the medium facing surface 80. The distance from the medium facing surface 80 to an arbitrary point on the end face of the magnetic layer 42 increases with increasing distance from the arbitrary point to the top surface $1a$ of the substrate 1.

The magnetic layer 43 is disposed on the magnetic layer 41. As shown in FIG. 6, the second layer 22 is wound approximately two turns around the magnetic layer 43. The magnetic head further includes an insulating film 63 made of an insulating material and interposed between the second layer 22 and each of the magnetic layers 42 and 43 and the insulating layer 62, an insulating layer 64 made of an insulating material and disposed in the space between adjacent turns of the second layer 22, and an insulating layer 65 made of an insulating material and disposed around the second layer 22 and the magnetic layer 42. The top surfaces of the second layer 22, the magnetic layers 42 and 43, the insulating film 63, and the insulating layers 64 and 65 are even with each other. The magnetic head further includes an insulating layer 66 made of an insulating material and disposed over the top surfaces of the second layer 22, the insulating film 63 and the insulating layer 64. The insulating film 63 and the insulating layers 65 and 66 are made of alumina, for example. The insulating layer 64 is made of photoresist, for example.

The magnetic layer 44 is disposed over the magnetic layers 42 and 43 and the insulating layer 66, and connects the magnetic layer 42 and the magnetic layer 43 to each other. The magnetic layer 44 has an end face facing toward the medium facing surface 80, the end face being located at a distance from the medium facing surface 80. The distance from the medium facing surface 80 to an arbitrary point on the end face of the magnetic layer 44 increases with increasing distance from the arbitrary point to the top surface $1a$ of the substrate 1.

The magnetic head further includes an insulating layer 67 made of an insulating material and disposed around the magnetic layer 44, and a protective layer 70 made of a nonmagnetic material and disposed to cover the write head section 9. The insulating layer 67 is made of alumina, for example. The protective layer 70 is made of, for example, an inorganic insulating material such as alumina.

As has been described, the magnetic head according to the present embodiment includes the medium facing surface 80, the read head section 8, and the write head section 9. The medium facing surface 80 faces a recording medium. The read head section 8 and the write head section 9 are stacked on the substrate 1. The read head section 8 is located on the rear side in the direction T of travel of the recording medium (i.e., located on the leading side) relative to the write head section 9.

The write head section 9 includes the coil including the first and second portions 10 and 20, the main pole 15, the write shield 16, the gap part 17, and the first and second return path sections 30 and 40. The write shield 16 includes the first shield 16A, the second shield 16B, and the two side shields 16C and 16D. The gap part 17 is composed of part of the first gap layer 19 and part of the second gap layer 18. The first return path section 30 and the second return path section 40 align along the direction perpendicular to the top surface $1a$ of the substrate 1 with the main pole 15 interposed therebetween.

The first return path section 30 includes the magnetic layers 31 to 36, and is located on the rear side in the direction T of travel of the recording medium relative to the main pole 15. As shown in FIG. 2, the first return path section 30 connects the write shield 16 and part of the main pole 15 away from the medium facing surface 80 to each other so that a first space S1 is defined by the main pole 15, the gap part 17 (the gap layer 18), the write shield 16, and the first return path section 30 (the magnetic layers 31 to 36). The first portion 10 of the coil passes through the first space S1.

The magnetic layer 31 is located closer to the top surface $1a$ of the substrate 1 than is the first space S1. The magnetic layer 32 has an end face facing toward the medium facing surface 80 and located at a distance from the medium facing surface 80. Part of the insulating layer 54 is interposed between the medium facing surface 80 and the aforementioned end face of the magnetic layer 32. The magnetic layer 32 is interposed between the first space S1 and the medium facing surface 80 without being exposed in the medium facing surface 80, and is connected to the magnetic layer 31. The magnetic layer 34 magnetically couples the second shield 16B of the write shield 16 and the magnetic layer 32 to each other. In the main cross section, the magnetic layer 34 is greater than the second shield 16B in length in a direction perpendicular to the medium facing surface 80. The magnetic layers 33, 35 and 36 are located farther from the medium facing surface 80 than is the first space S1, and magnetically couple the main pole 15 and the magnetic layer 31 to each other.

The second return path section 40 includes the magnetic layers 41 to 44, and is located on the front side in the direction T of travel of the recording medium relative to the main pole 15. The second return path section 40 connects the write shield 16 and part of the main pole 15 away from the medium facing surface 80 to each other so that a second space S2 is defined by the main pole 15, the gap part 17 (the gap layer 19), the write shield 16, and the second return path section 40 (the magnetic layers 41 to 44). The second portion 20 of the coil passes through the second space S2.

The first and second portions 10 and 20 of the coil will now be described in detail with reference to FIG. 4 to FIG. 6. FIG. 4 is a plan view showing the first portion 10. The first portion 10 is wound approximately three turns around the magnetic layer 33 which constitutes part of the first return path section 30. The first portion 10 includes a portion that passes between the magnetic layer 32 and the magnetic layer 33, in particular, within the first space S1. The first portion 10 has a coil connection part 10E electrically connected to the second portion 20.

FIG. 5 is a plan view showing the first layer 21 of the second portion 20. The first layer 21 is wound one turn around the magnetic layer 41 which constitutes part of the second return path section 40. The first layer 21 includes a portion that passes between the first shield 16A and the magnetic layer 41, in particular, within the second space S2. The first layer 21 has a coil connection part 21S electrically connected to the coil connection part 10E of the first portion 10, and a coil connection part 21E electrically connected to the second layer 22. The coil connection part 21S is electrically connected to the coil connection part 10E via first to third connection layers of columnar shape (not shown) that penetrate a plurality of layers interposed between the first layer 21 and the first portion 10. The first to third connection layers are stacked in this order on the coil connection part 10E. The coil connection part 21S is disposed on the third connection layer. The first to third connection layers are made of a conductive material such as copper.

FIG. 6 is a plan view showing the second layer 22 of the second portion 20. The second layer 22 is wound approximately two turns around the magnetic layer 43 which constitutes part of the second return path section 40. The second layer 22 includes a portion that passes between the magnetic layer 42 and the magnetic layer 43, in particular, within the second space S2. The second layer 22 has a coil connection part 22S penetrating the insulating layer 62 and the insulating film 63 and electrically connected to the coil connection part 21E of the first layer 21. In the example shown in FIG. 4 to FIG. 6, the first portion 10 and the second portion 20 are connected in series.

The shape of the main pole 15 will now be described in detail with reference to FIG. 1 and FIG. 3 to FIG. 6. As shown in FIG. 4 to FIG. 6, the main pole 15 includes a track width defining portion 15A and a wide portion 15B. The track width defining portion 15A has an end face located in the medium facing surface 80, and an end opposite to the end face. The wide portion 15B is connected to the end of the track width defining portion 15A. As shown in FIG. 1 and FIG. 3, the main pole 15 has the top surface 15T located at the end on the front side in the direction T of travel of the recording medium, the bottom end 15L opposite to the top surface 15T, the first side part, and the second side part. The width of the top surface 15T in the track width direction TW is greater in the wide portion 15B than in the track width defining portion 15A.

In the track width defining portion 15A, the width of the top surface 15T in the track width direction TW is generally constant regardless of the distance from the medium facing surface 80. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 80, then becoming constant. Here, the length of the track width defining portion 15A in the direction perpendicular to the medium facing surface 80 will be referred to as the neck height. The neck height falls within the range of 0 to 0.3 μm, for example. A zero neck height means that no track width defining portion 15A exists and an end face of the wide portion 15B is thus located in the medium facing surface 80.

At least one of the top surface 15T and the bottom end 15L of the main pole 15 includes an inclined portion. The inclined portion has a front end located in the medium facing surface 80 and a rear end opposite to the front end. In the present embodiment, in particular, each of the top surface 15T and the bottom end 15L includes a first inclined portion corresponding to the aforementioned inclined portion. In the present embodiment, each of the top surface 15T and the bottom end 15L includes a first flat portion, a second inclined portion, and a second flat portion that are arranged in this order of increasing distance from the medium facing surface 80, the first flat portion being contiguous with the first inclined portion. Hereinafter, the first inclined portion, the first flat portion, the second inclined portion, and the second flat portion of the top surface 15T will be represented by the symbols 15T1, 15T2, 15T3, and 15T4, respectively; the first inclined portion, the first flat portion, the second inclined portion, and the second flat portion of the bottom end 15L will be represented by the symbols 15L1, 15L2, 15L3, and 15L4, respectively The first flat portion 15T2 of the top surface 15T is connected to the rear end of the first inclined portion 15T1. The second inclined portion 15T3 has a front end connected to the first flat portion 15T2 and a rear end that is located farther from the medium facing surface 80 than is the front end. The second flat portion 15T4 is connected to the rear end of the second inclined portion 15T3.

The first flat portion 15L2 of the bottom end 15L is connected to the rear end of the first inclined portion 15L1. The second inclined portion 15L3 has a front end connected to the first flat portion 15L2 and a rear end that is located farther from the medium facing surface 80 than is the front end. Each of the first inclined portion 15L1, the first flat portion 15L2 and the second inclined portion 15L3 may be an edge formed by two intersecting planes, or may be a plane connecting two planes to each other. The second flat portion 15L4 is a plane connected to the rear end of the second inclined portion 15L3.

The end face of the main pole 15 has an end located on the front side in the direction T of travel of the recording medium and an end located on the rear side in the direction T of travel of the recording medium. The end of the end face of the main pole 15 located on the front side in the direction T of travel of the recording medium also serves as the front end of the first inclined portion 15T1 of the top surface 15T. The end of the end face of the main pole 15 located on the rear side in the direction T of travel of the recording medium also serves as the front end of the first inclined portion 15L1 of the bottom end 15L. Here, as shown in FIG. 1, assume a first virtual plane P1 and a second virtual plane P2. The first virtual plane P1 passes through the end of the end face of the main pole 15 located on the front side in the direction T of travel of the recording medium (the front end of the first inclined portion 15T1) and is perpendicular to the medium facing surface 80 and to the direction T of travel of the recording medium. The second virtual plane P2 passes through the end of the end face of the main pole 15 located on the rear side in the direction T of travel of the recording medium (the front end of the first inclined portion 15L1) and is perpendicular to the medium facing surface 80 and to the direction T of travel of the recording medium.

The first and second inclined portions 15T1 and 15T3 of the top surface 15T are inclined relative to the first and second virtual planes P1 and P2 and the medium facing surface 80 such that their respective rear ends are located farther from the first and second virtual planes P1 and P2 than are their respective front ends. In other words, the first and second inclined portions 15T1 and 15T3 are inclined such that their respective rear ends are located on the front side in the direction T of travel of the recording medium relative to their respective front ends. The first and second flat portions 15T2 and 15T4 are substantially parallel to the first and second virtual planes P1 and P2.

The first and second inclined portions 15L1 and 15L3 of the bottom end 15L are inclined relative to the first and second virtual planes P1 and P2 and the medium facing surface 80 such that their respective rear ends are located farther from the first and second virtual planes P1 and P2 than are their respective front ends. In other words, the first and second inclined portions 15L1 and 15L3 are inclined such that their respective rear ends are located on the rear side in the direction T of travel of the recording medium relative to their respective front ends. The first and second flat portions 15L2 and 15L4 are substantially parallel to the first and second virtual planes P1 and P2.

The end face of the main pole 15 located in the medium facing surface 80 has a first side adjacent to the first gap layer 19, a second side connected to one end of the first side, and a third side connected to the other end of the first side. The first side also serves as the end of the end face of the main pole 15 located on the front side in the direction T of travel of the recording medium, and also serves as the front end of the first inclined portion 15T1 of the top surface 15T. The first side defines the track width. The position of an end of a record bit to be recorded on a recording medium depends on the position of the first side. The end face of the main pole 15 located in the medium facing surface 80 decreases in width in the track width direction TW with increasing distance from the first side, that is, with increasing distance from the first virtual plane P1. Each of the second side and the third side forms an angle of, for example, 7° to 17°, or preferably 10° to 15°, relative to a direction perpendicular to the first virtual plane P1. The first side has a length in the range of 0.05 to 0.20 μm, for example.

Reference is now made to FIG. 1 to describe the shapes and arrangement of the first inclined surface 16Ab, the first inclined surface 16Bb, and the second inclined surface 16Bc in detail. The first inclined surface 16Ab is opposed to the first inclined portion 15T1 of the top surface 15T with the gap part 17 (the first gap layer 19) interposed therebetween. The first inclined surface 16Ab has a first end EA1 located in the medium facing surface 80 and a second end EA2 opposite to the first end EA1. The first inclined surface 16Ab is inclined relative to the first and second virtual planes P1 and P2 and the medium facing surface 80 such that the second end EA2 is located farther from the first and second virtual planes P1 and P2 than is the first end EA1. In other words, the first inclined surface 16Ab is inclined such that the second end EA2 is located on the front side in the direction T of travel of the recording medium relative to the first end EA1.

The first inclined surface 16Bb is opposed to the first inclined portion 15L1 of the bottom end 15L with the gap part 17 (the second gap layer 18) interposed therebetween. The first inclined surface 16Bb has a first end EB1 located in the medium facing surface 80 and a second end EB2 opposite to the first end EB1. The first inclined surface 16Bb is inclined relative to the first and second virtual planes P1 and P2 and the medium facing surface 80 such that the second end EB2 is located farther from the first and second virtual planes P1 and P2 than is the first end EB1. In other words, the first inclined surface 16Bb is inclined such that the second end EB2 is located on the rear side in the direction T of travel of the recording medium relative to the first end EB1.

The second inclined surface 16Bc has a third end EB3 connected to the second end EB2, and a fourth end EB4 opposite to the third end EB3. The second inclined surface 16Bc is inclined relative to the first and second virtual planes P1 and P2 and the medium facing surface 80 such that the fourth end EB4 is located farther from the first and second virtual planes P1 and P2 than is the third end EB3. In other words, the second inclined surface 16Bc is inclined such that the fourth end EB4 is located on the rear side in the direction T of travel of the recording medium relative to the third end EB3.

As shown in FIG. 1, the angle that the first inclined surface 16Bb forms relative to the direction perpendicular to the medium facing surface 80 will be represented by the symbol $\theta 1$, and the angle that the second inclined surface 16Bc forms relative to the direction perpendicular to the medium facing surface 80 will be represented by the symbol $\theta 2$. The angle $\theta 2$ is greater than the angle $\theta 1$. The angle $\theta 1$ preferably falls within the range of 30° to 45°. The angle $\theta 2$ preferably falls within the range of 50° to 65°. The distance between the main pole 15 and an arbitrary point on the second inclined surface, 16Bc increases with decreasing distance between the arbitrary point and the fourth end EB4.

The function and effects of the magnetic head according to the present embodiment will now be described. The magnetic head writes data on a recording medium by using the write head section 9 and reads data stored on the recording medium by using the read head section 8. In the write head section 9, the coil including the first and second portions 10 and 20 produces magnetic fields corresponding to data to be written on a recording medium. A magnetic flux corresponding to the magnetic field produced by the first portion 10 passes through the first return path section 30 and the main pole 15. A magnetic flux corresponding to the magnetic field produced by the second portion 20 passes through the second return path section 40 and the main pole 15. Consequently, the main pole 15 allows the magnetic flux corresponding to the magnetic field produced by the first portion 10 and the magnetic flux corresponding to the magnetic field produced by the second portion 20 to pass.

The first and second portions 10 and 20 may be connected in series or in parallel. In either case, the first and second portions 10 and 20 are connected such that the magnetic flux corresponding to the magnetic field produced by the first portion 10 and the magnetic flux corresponding to the magnetic field produced by the second portion 20 flow in the same direction through the main pole 15.

The main pole 15 allows the magnetic fluxes corresponding to the magnetic fields produced by the coil to pass as mentioned above, and produces a write magnetic field for writing data on a recording medium by means of the perpendicular magnetic recording system.

The write shield 16 captures a disturbance magnetic field applied to the magnetic head from the outside thereof. This makes it possible to prevent erroneous writing on a recording medium induced by the disturbance magnetic field intensively captured into the main pole 15. The write shield 16 also has the function of capturing a magnetic flux produced from the end face of the main pole 15 and spreading in directions other than the direction perpendicular to the plane of a recording medium, so as to prevent the magnetic flux from reaching the recording medium.

Furthermore, the write shield 16 and the first and second return path sections 30 and 40 have the function of allowing a magnetic flux that has been produced from the end face of the main pole 15 and has magnetized a recording medium to flow back. More specifically, a part of the magnetic flux that has been produced from the end face of the main pole 15 and has magnetized a recording medium flows back to the main pole 15 through the write shield 16 and the first return path section 30. Another part of the magnetic flux that has been produced from the end face of the main pole 15 and has magnetized the recording medium flows back to the main pole 15 through the write shield 16 and the second return path section 40.

The write shield 16 includes the first shield 16A, the second shield 16B, and the two side shields 16C and 16D. The present embodiment thus makes it possible that, in regions on both the front side and the rear side in the direction T of travel of a recording medium relative to the end face of the main pole 15 and regions on opposite sides of the end face of the main pole 15 in the track width direction TW, a magnetic flux that is produced from the end face of the main pole 15 and spreads in directions other than the direction perpendicular to the plane of the recording medium can be captured and thereby prevented from reaching the recording medium. Consequently, the present embodiment makes it possible to prevent adjacent track erasure induced by a skew. The first and second shields 16A and 16B contribute not only to the prevention of adjacent track erasure induced by a skew but also to an increase in the gradient of the write magnetic field. The side shields 16C and 16D greatly contribute to the prevention of adjacent track erasure, in particular. According to the present embodiment, such functions of the write shield 16 serve to increase the recording density.

Furthermore, as shown in FIG. 3, the present embodiment is configured so that in the medium facing surface 80, the distance between the first and second side parts of the main pole 15 in the track width direction TW, i.e., the width of the end face of the main pole 15, decreases with increasing distance from the first virtual plane P1. This feature of the present embodiment also serves to prevent adjacent track erasure induced by a skew.

The present embodiment is also configured so that in the medium facing surface 80, the distance between the first and second sidewalls of the side shields 16C and 16D in the track width direction TW decreases with increasing distance from the first virtual plane P1, as does the distance between the first and second side parts of the main pole 15. The present embodiment thus allows both the distance between the first side part and the first sidewall and the distance between the second side part and the second sidewall to be small and constant in the medium facing surface 80. This configuration allows the side shields 16C and 16D to efficiently capture the magnetic flux that is produced from the end face of the main pole 15 and spreads out to opposite areas in the track width direction TW. Consequently, according to the present embodiment, it is possible to enhance the function of the side shields 16C and 16D in particular, and to thereby enable more effective prevention of adjacent track erasure induced by a skew.

The write shield 16 cannot capture much magnetic flux if the write shield 16 is not magnetically connected with any magnetic layer having a sufficiently large volume enough to accommodate the magnetic flux captured by the write shield 16. In the present embodiment, there are provided the first return path section 30 (the magnetic layers 31 to 36) which magnetically couples the second shield 16B of the write shield 16 and the main pole 15 to each other, and the second return path section 40 (the magnetic layers 41 to 44) which magnetically couples the first shield 16A of the write shield 16 and the main pole 15 to each other. Such a configuration allows the magnetic flux captured by the write shield 16 to flow into the main pole 15 by way of the first and second return path sections 30 and 40. In the present embodiment, the first and second return path sections 30 and 40 and the main pole 15, which are magnetic layers large in volume, are magnetically connected to the write shield 16. This allows the write shield 16 to capture much magnetic flux, so that the above-described effect of the write shield 16 can be exerted effectively.

If the first return path section has an end face that is exposed over a large area in the medium facing surface 80, part of the magnetic flux that has been captured from the end face of the write shield 16 into the write shield 16 and has reached the first return path section may leak from the end face of the first return path section toward the recording medium. This may result in the occurrence of adjacent track erasure. Furthermore, heat generated by the first portion 10 of the coil may cause expansion of part of the first return path section and thereby cause the end face of the first return path section which constitutes part of the medium facing surface 80 to protrude toward the recording medium. As a result, the end face of the main pole 15 and an end of the read head section 8 located in the medium facing surface 80 may get farther from the recording medium. This may result in degradation of the read and write characteristics.

In contrast to this, in the present embodiment, the first return path section 30 does not have an end face that is exposed over a large area in the medium facing surface 80. More specifically, in the present embodiment, the magnetic layer 32 which constitutes part of the first return path section 30 is interposed between the first space S1 and the medium facing surface 80 without being exposed in the medium facing surface 80, and is connected to the magnetic layer 31. The magnetic layer 34 magnetically couples the second shield 16B of the write shield 16 and the magnetic layer 32 to each other. The present embodiment is particularly configured so that in the main cross section, the magnetic layer 34 is greater than the second shield 16B in length in the direction perpendicular to the medium facing surface 80. This allows the first return path section 30 to be connected to the write shield 16 while allowing a reduction in the area of the end face of the first return path section 30 exposed in the medium facing surface 80. Consequently, according to the present embodiment, it is possible to avoid the above-described problems resulting from the configuration in which the end face of the first return path section is exposed over a large area in the medium facing surface 80. Specifically, the present embodiment makes it possible to suppress the leakage of magnetic flux from the first return path section 30 toward the recording medium and suppress the protrusion of part of the medium facing surface 80 in the vicinity of the magnetic layer 32.

In the present embodiment, in particular, the insulating layer 54 which is harder than the magnetic layer 32 is provided between the magnetic layer 32 and the medium facing surface 80. The insulating layer 54 exists over a larger area than does the magnetic layer 32. The insulating layer 54 thus functions to prevent changes in the position of the magnetic layer 32 induced by the heat generated by the first portion 10. Consequently, the present embodiment makes it possible to more effectively suppress the protrusion of part of the medium facing surface 80 in the vicinity of the magnetic layer 32.

Furthermore, in the present embodiment, the top surface 15T of the main pole 15 includes the first and second inclined portions 15T1 and 15T3 which are inclined relative to the first and second virtual planes P1 and P2 and the medium facing surface 80, while the bottom end 15L of the main pole 15 includes the first and second inclined portions 15L1 and 15L3 which are inclined relative to the first and second virtual planes P1 and P2 and the medium facing surface 80. This allows the main pole 15 to have a small thickness in the medium facing surface 80, thereby allowing the prevention of adjacent track erasure induced by a skew. On the other hand, since a portion of the main pole 15 away from the medium facing surface 80 can have a large thickness, it is possible for the main pole 15 to direct much magnetic flux to the medium facing surface 80, and this allows the improvement of write characteristics such as the overwrite property.

Furthermore, in the present embodiment, the second shield 16B of the write shield 16 has the first and second inclined surfaces 16Bb and 16Bc which are inclined relative to the first and second virtual planes P1 and P2 and the medium facing surface 80. The angle θ2 that the second inclined surface 16Bc forms relative to the direction perpendicular to the medium facing surface 80 is greater than the angle θ1 that the first inclined surface 16Bb forms relative to the direction perpendicular to the medium facing surface 80. If the angle θ2 is equal to the angle θ1, the first and second inclined surfaces 16Bb and 16Bc are opposed to the first and second inclined portions 15L1 and 15L3 over a large area with a small spacing therebetween. This leads to a problem that a large amount of magnetic flux leaks from the main pole 15 to the second shield 16B, and causes degradation in write characteristics such as the overwrite property. If the angle θ2 is set to 90° in order to prevent the aforementioned problem, the volume of the second shield 16B decreases to compromise the function of the write shield 16. More specifically, a decrease in the volume of the second shield 16B is likely to cause magnetic flux saturation in the second shield 16B. This in turn leads to magnetic flux leakage from the second shield 16B to the medium facing surface 80, raising a problem that the magnetic flux leakage may induce accidental erasure of data stored on the recording medium.

In the present embodiment, the second inclined surface 16Bc is inclined relative to the first and second virtual planes P1 and P2 and the medium facing surface 80. This allows the second shield 16B to be greater in volume than in the case where the angle θ2 is 90°, thereby allowing the prevention of magnetic flux saturation in the write shield 16. Furthermore, in the present embodiment, the angle θ2 is greater than the angle θ1, and the distance between the main pole 15 and an arbitrary point on the second inclined surface 16Bc increases with decreasing distance between the arbitrary point and the fourth end EB4. This makes it possible to prevent magnetic flux leakage from the main pole 15 to the second shield 16B while preventing magnetic flux saturation in the write shield 16 as mentioned above. Consequently, according to the present embodiment, it is possible to prevent the skew-induced problems and provide improved write characteristics without compromising the function of the write shield 16 (the second shield 16B).

A method of manufacturing the magnetic head according to the present embodiment will now be described with reference to FIG. 7A through FIG. 22B. FIG. 7A through FIG. 22B each show a stack of layers formed in the process of manufacturing the magnetic head. FIG. 16A through FIG. 21B omit portions located below the nonmagnetic layer 73. FIG. 7A to FIG. 22A each show the main cross section. FIG. 7B to FIG. 22B each show a cross section taken at the position at which the medium facing surface 80 is to be formed. The symbol "ABS" in FIG. 7A to FIG. 22A indicates the position at which the medium facing surface 80 is to be formed.

Figure 7A:
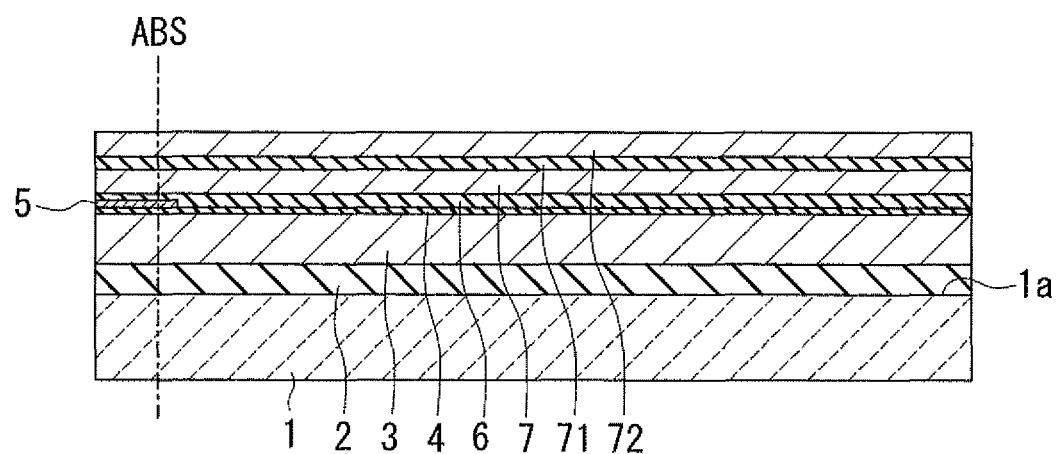
FIG. 7A and FIG. 7B are cross-sectional views showing a step of a method of manufacturing the magnetic head according to the first embodiment of the invention.
Figure 7B:
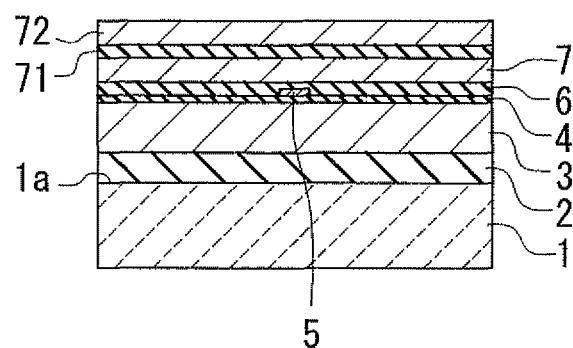

In the method of manufacturing the magnetic head according to the present embodiment, first, as shown in FIG. 7A and FIG. 7B, the insulating layer 2, the first read shield layer 3, and the first read shield gap film 4 are formed in this order on the substrate 1. Next, the MR element 5 and leads (not shown) connected to the MR element 5 are formed on the first read shield gap film 4. The MR element 5 and the leads are then covered with the second read shield gap film 6. Then, the second read shield layer 7, the nonmagnetic layer 71, and the middle shield layer 72 are formed in this order on the second read shield gap film 6.

Figure 8A:
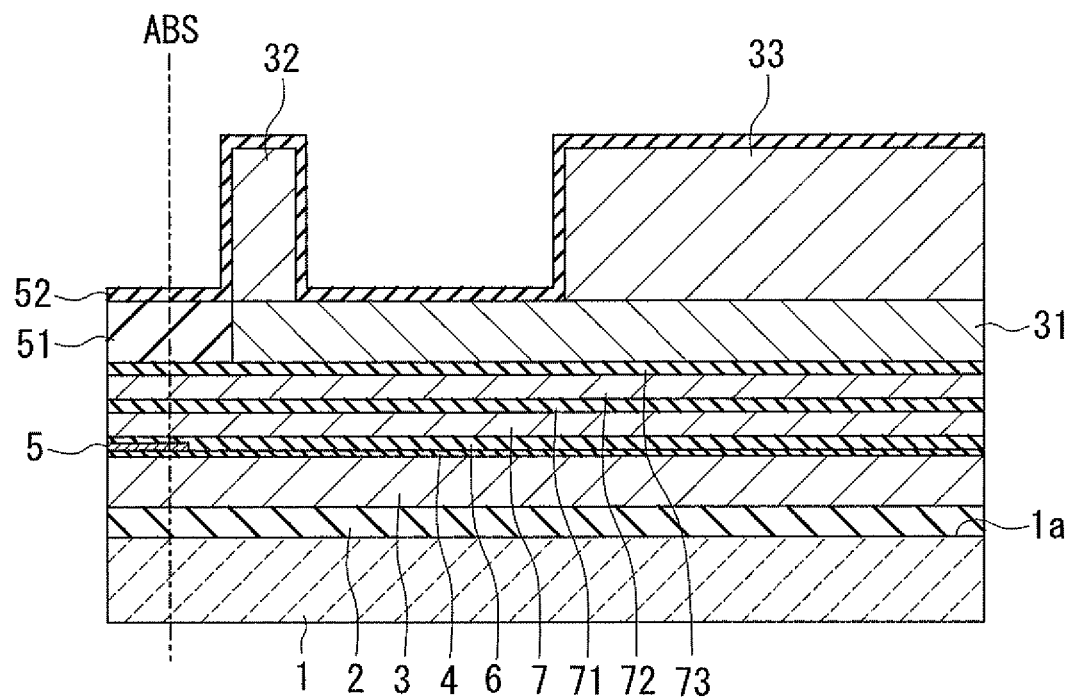
FIG. 8A and FIG. 8B are cross-sectional views showing a step that follows the step shown in FIG. 7A and FIG. 7B.
Figure 8B:
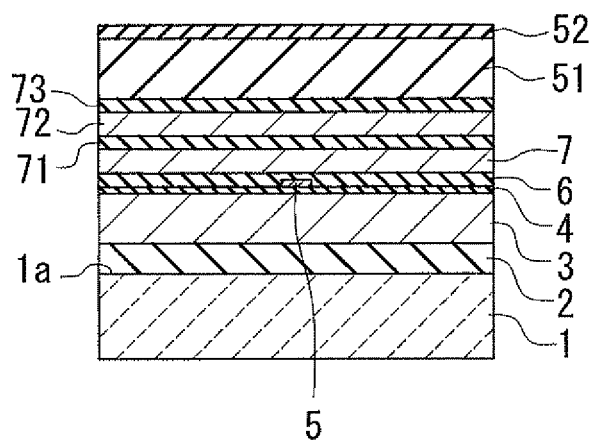

FIG. 8A and FIG. 8B show the next step. In this step, first, the nonmagnetic layer 73 is formed on the middle shield layer 72. The magnetic layer 31 is then formed on the nonmagnetic layer 73 by frame plating, for example. Next, the insulating layer 51 is formed over the entire top surface of the stack. The insulating layer 51 is then polished by, for example, chemical mechanical polishing (hereinafter referred to as CMP), until the magnetic layer 31 is exposed. The top surfaces of the magnetic layer 31 and the insulating layer 51 are thereby made even with each other. Next, the magnetic layers 32 and 33 are formed on the magnetic layer 31 by frame plating, for example. The insulating film 52 is then formed over the entire top surface of the stack. Where alumina is selected as the material of the insulating film 52, the insulating film 52 is formed by atomic layer deposition, for example.

Figure 9A:
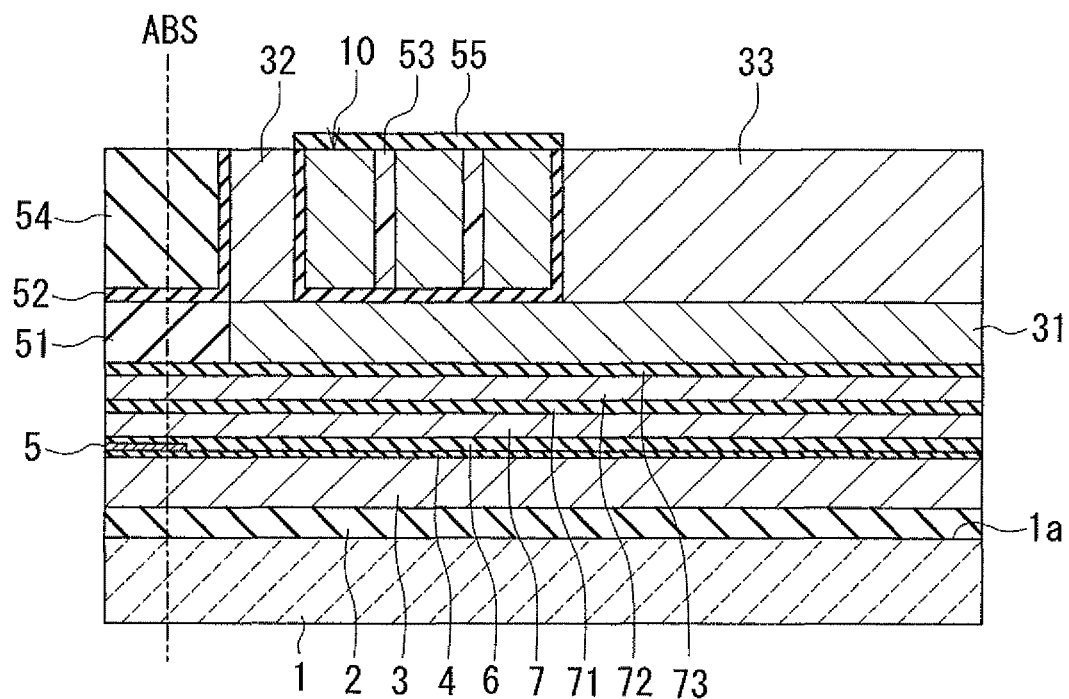
FIG. 9A and FIG. 9B are cross-sectional views showing a step that follows the step shown in FIG. 8A and FIG. 8B.
Figure 9B:
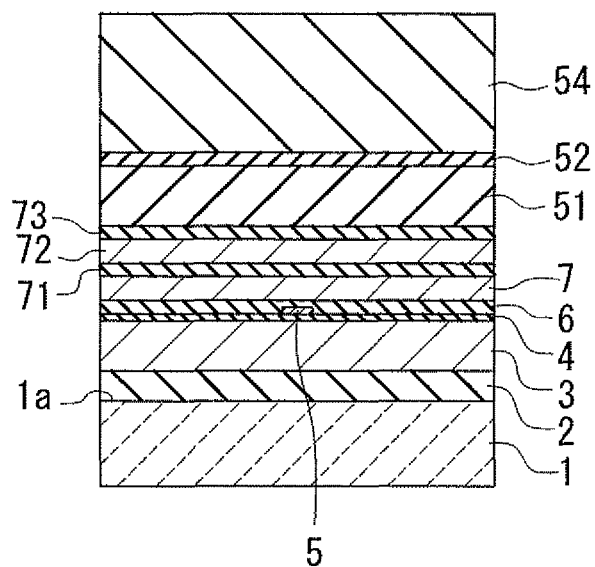

FIG. 9A and FIG. 9B show the next step. In this step, first, the first portion 10 of the coil is formed by frame plating, for example. The insulating layer 53 is then formed in the space between adjacent turns of the first portion 10. The first portion 10 and the insulating layer 53 are formed such that their top surfaces are higher in level than portions of the insulating film 52 that are located on the magnetic layers 32 and 33. Next, the insulating layer 54 is formed over the entire top surface of the stack. The first portion 10, the insulating film 52, and the insulating layers 53 and 54 are then polished by, for example, CMP, until the magnetic layers 32 and 33 are exposed. The top surfaces of the first portion 10, the magnetic layers 32 and 33, the insulating film 52, and the insulating layers 53 and 54 are thereby made even with each other.

Next, the insulating layer 55 is formed over the entire top surface of the stack. The insulating layer 55 is then selectively etched by, for example, ion beam etching (hereinafter referred to as IBE) so that the top surfaces of the magnetic layers 32 and 33, part of the top surface of the insulating layer 54, and the coil connection part 10E (see FIG. 4) of the first portion 10 are exposed.

Figure 10A:
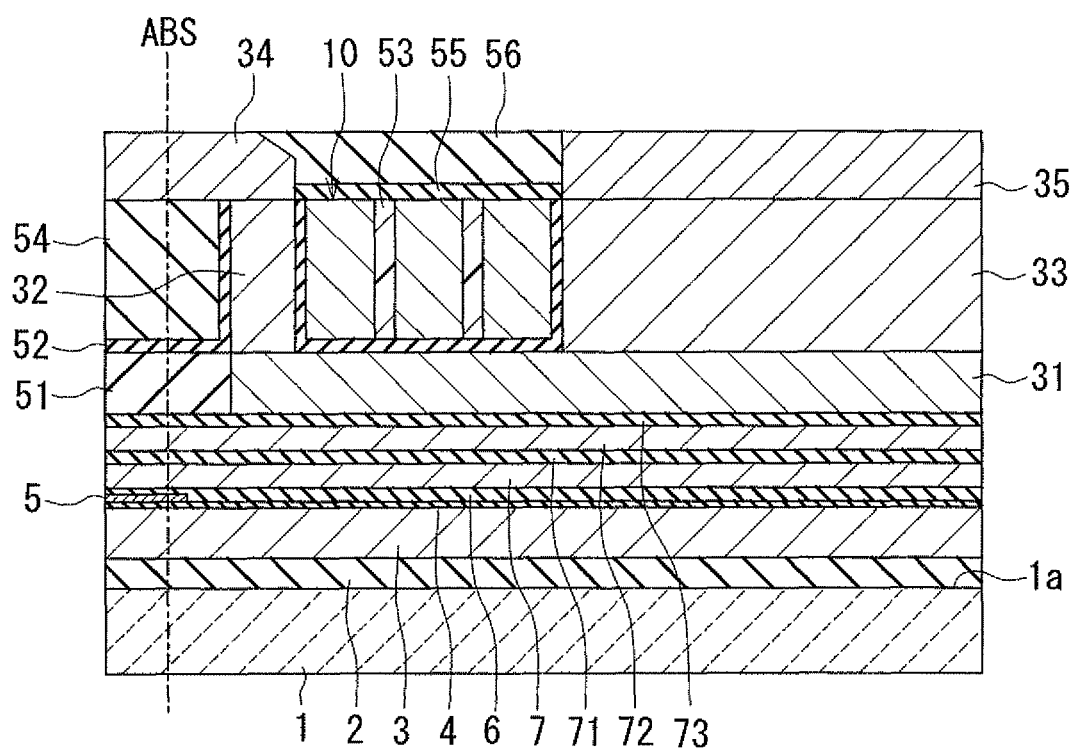
FIG. 10A and FIG. 10B are cross-sectional views showing a step that follows the step shown in FIG. 9A and FIG. 9B.
Figure 10B:
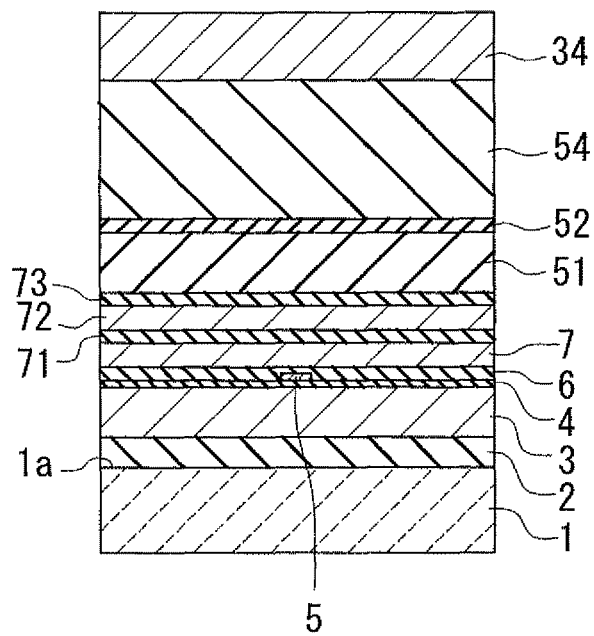

FIG. 10A and FIG. 10B show the next step. In this step, first, the magnetic layer 34 is formed over the magnetic layer 32 and the insulating layer 54, the magnetic layer 35 is formed on the magnetic layer 33, and the first connection layer (not shown) is formed on the coil connection part 10E of the first portion 10, by performing frame plating, for example. Next, part of the magnetic layer 34 is taper-etched by, for example, IBE, so that the magnetic layer 34 is provided with the connecting surface mentioned previously. Next, the insulating layer 56 is formed over the entire top surface of the stack. The insulating layer 56 is then polished by, for example, CMP, until the magnetic layers 34 and 35 and the first connection layer are exposed. The top surfaces of the magnetic layers 32 and 33, the first connection layer, and the insulating layer 56 are thereby made even with each other.

Figure 11A:
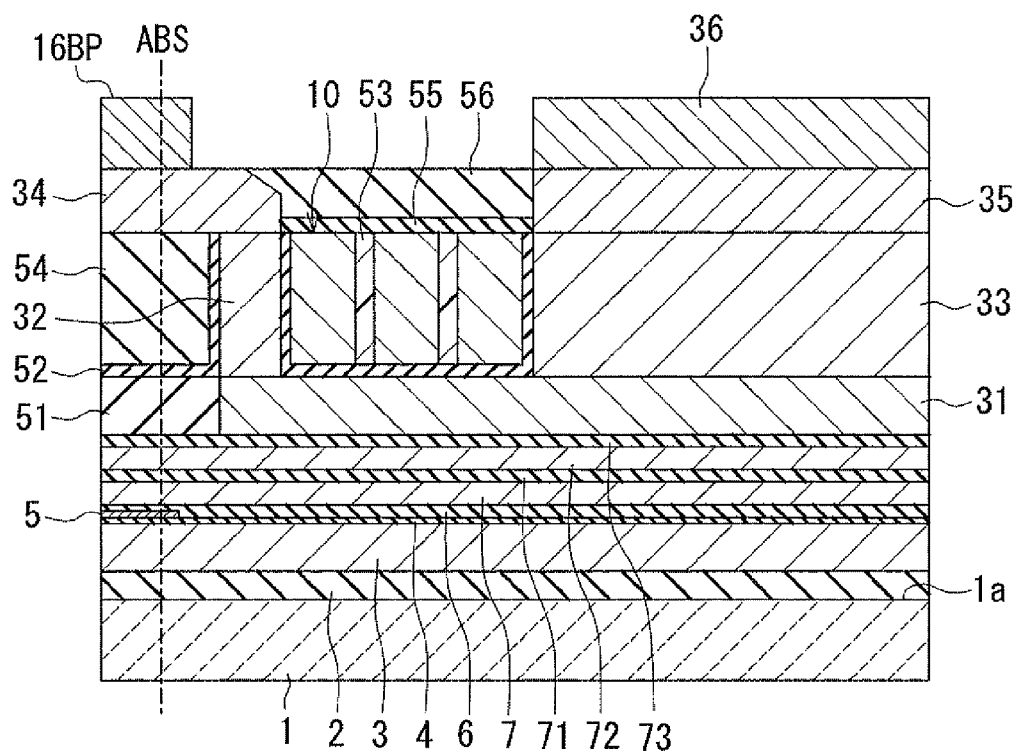
FIG. 11A and FIG. 11B are cross-sectional views showing a step that follows the step shown in FIG. 10A and FIG. 10B.
Figure 11B:
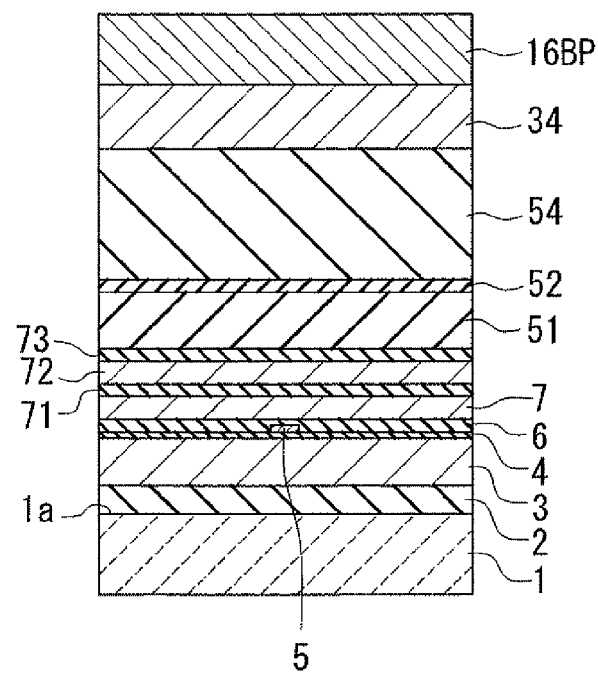

FIG. 11A and FIG. 11B show the next step. In this step, a magnetic layer 16BP, which is to later become the second shield 16B, is formed on the magnetic layer 34, the magnetic layer 36 is formed on the magnetic layer 35, and the second connection layer (not shown) is formed on the first connection layer, by performing frame plating, for example.

Figure 12A:
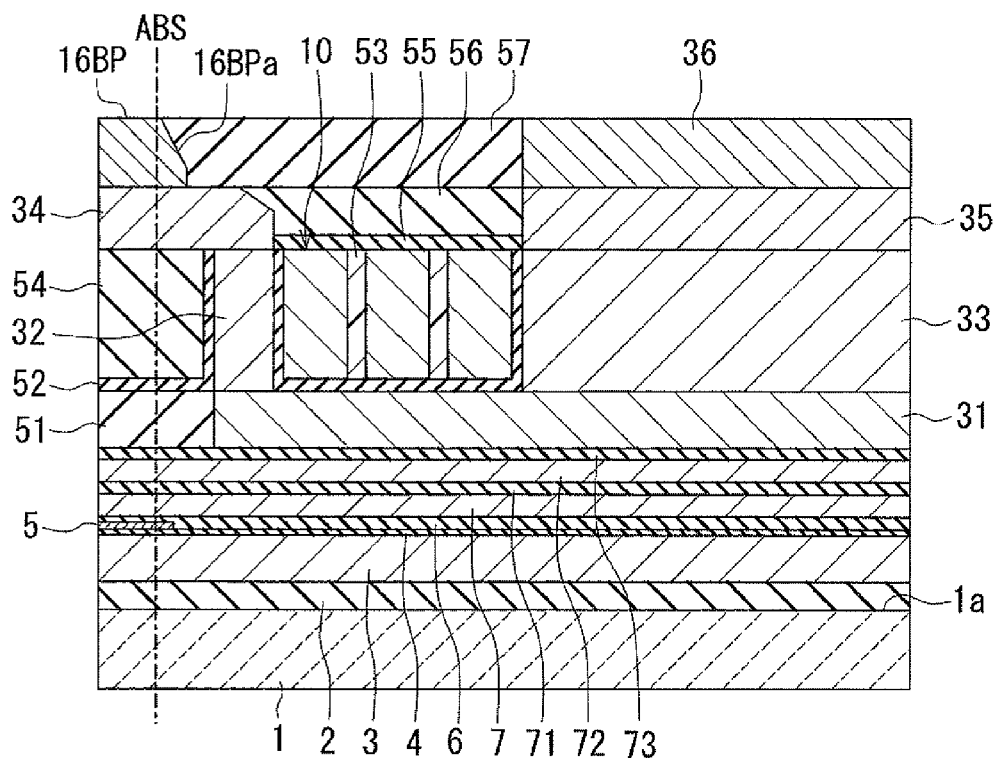
FIG. 12A and FIG. 12B are cross-sectional views showing a step that follows the step shown in FIG. 11A and FIG. 11B.
Figure 12B:
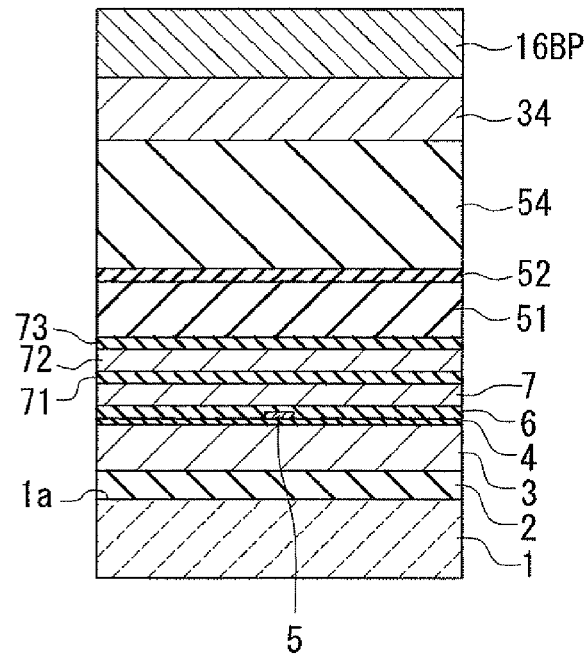

FIG. 12A and FIG. 12B show the next step. In this step, first, part of the magnetic layer 16BP is taper-etched by, for example, IBE, so that the magnetic layer 16BP is provided with an inclined surface 16BPa including a portion that is to later become the second inclined surface 16Bc. Next, the nonmagnetic layer 57 is formed over the entire top surface of the stack. The nonmagnetic layer 57 is then polished by, for example, CMP, until the magnetic layers 16BP and 36 and the second connection layer are exposed. The top surfaces of the magnetic layers 16BP and 36, the second connection layer, and the nonmagnetic layer 57 are thereby made even with each other.

Figure 13A:
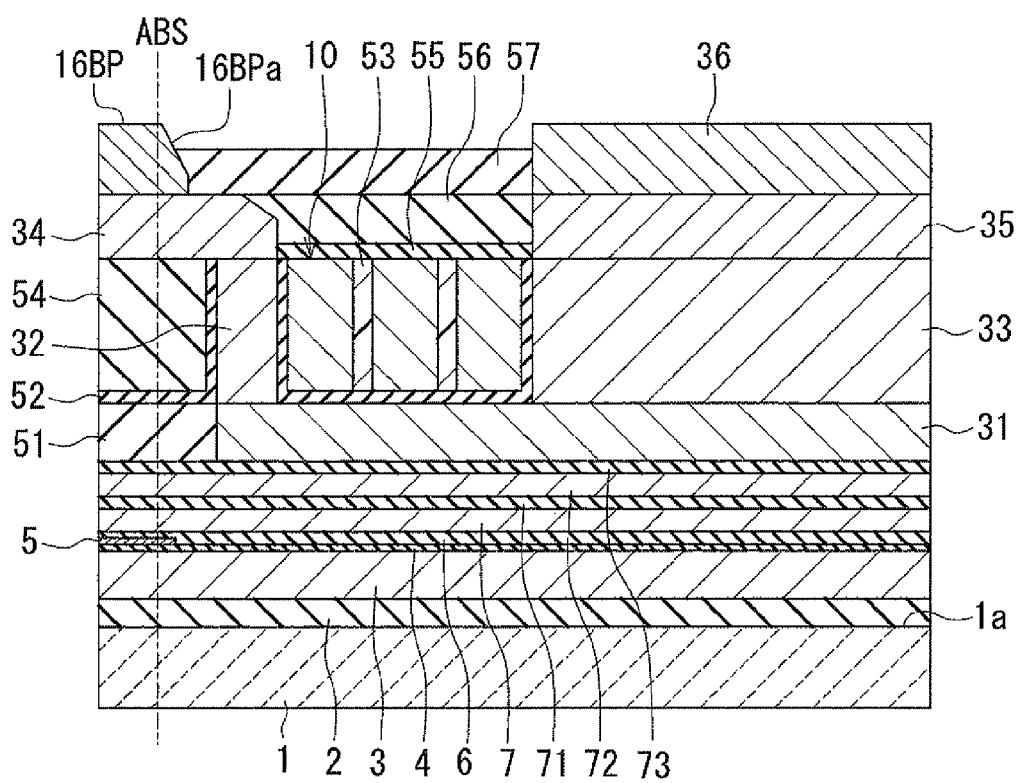
FIG. 13A and FIG. 13B are cross-sectional views showing a step that follows the step shown in FIG. 12A and FIG. 12B.
Figure 13B:
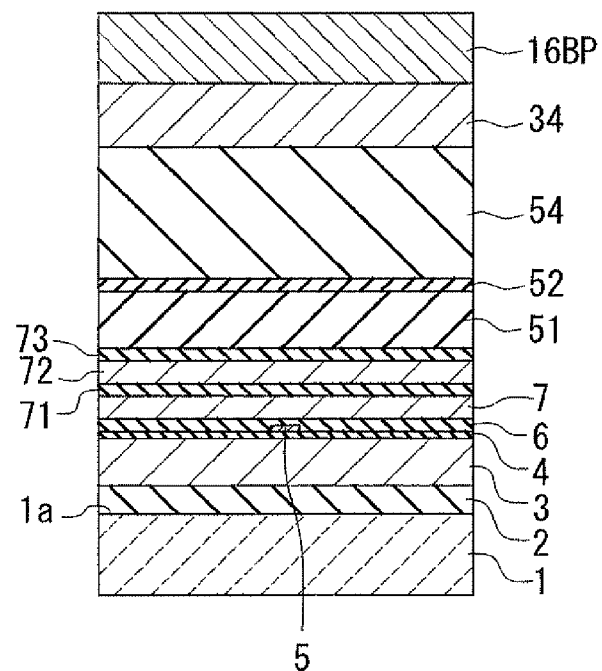

FIG. 13A and FIG. 13B show the next step. In this step, first, part of the nonmagnetic layer 57 is etched by, for example, reactive ion etching (hereinafter referred to as RIE) so as to expose an area of the inclined surface 16BPa of the magnetic layer 16BP where the first inclined surface 16Bb is to be formed later.

Figure 14A:
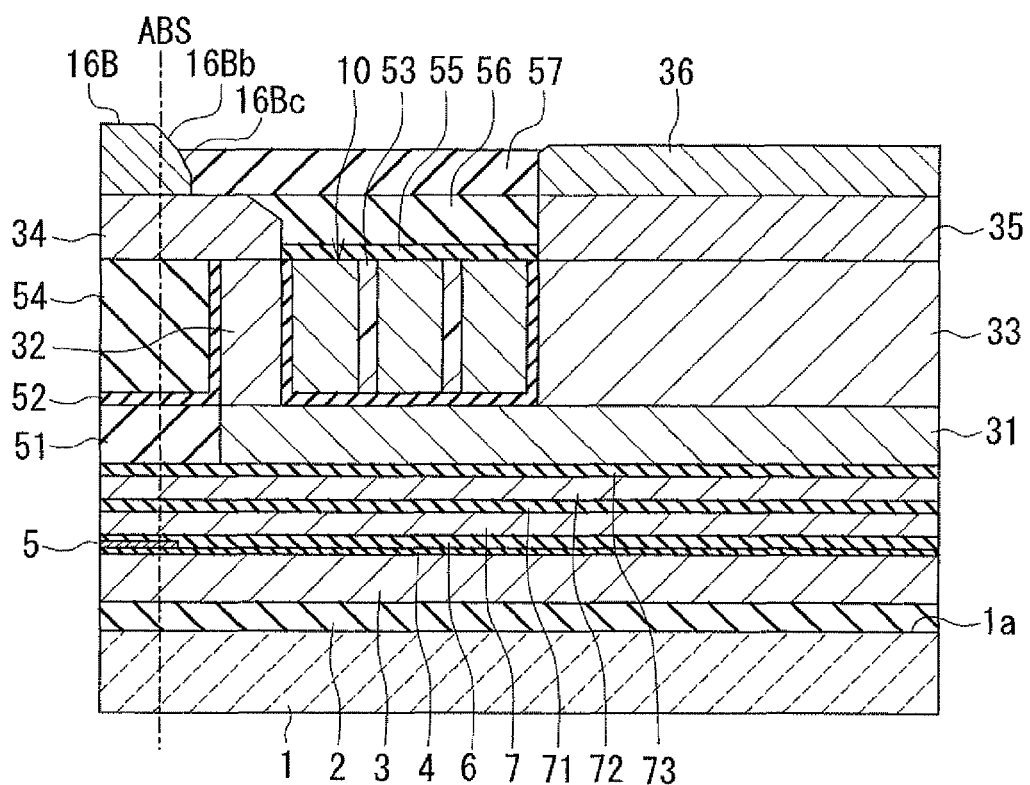
FIG. 14A and FIG. 14B are cross-sectional views showing a step that follows the step shown in FIG. 13A and FIG. 13B.
Figure 14B:
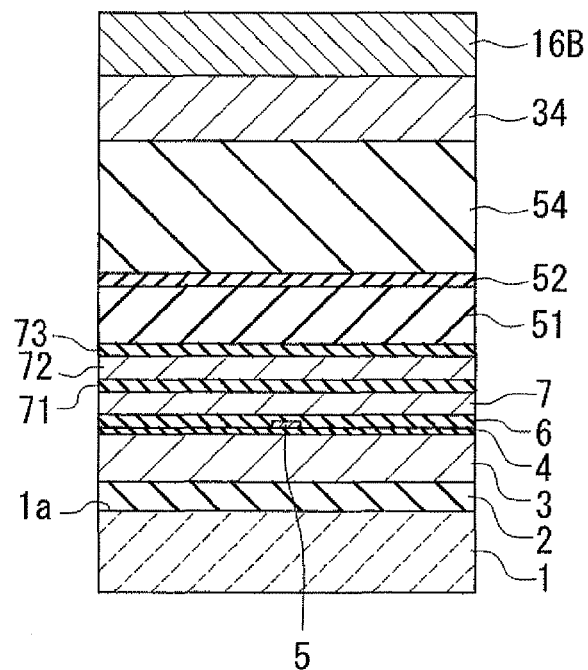

FIG. 14A and FIG. 14B show the next step. In this step, first, part of the inclined surface 16BPa of the magnetic layer 16BP is taper-etched by, for example, IBE, so that the magnetic layer 16BP is provided with the first inclined surface 16Bb. The rest of the inclined surface 16BPa remaining unetched makes the second inclined surface 16Bc. The magnetic layer 16BP thereby becomes the second shield 16B. Next, part of the magnetic layer 36 is etched by, for example, RIE, so as to chamfer corners at the edge of the top surface of the magnetic layer 36.

Figure 15A:
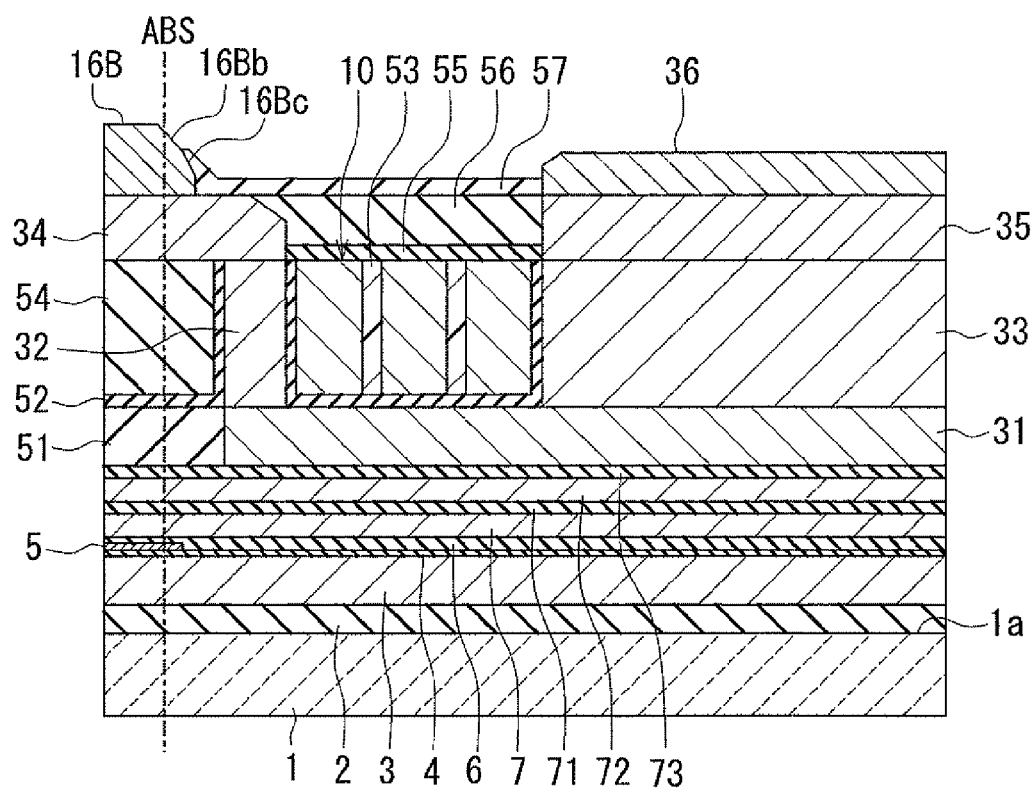
FIG. 15A and FIG. 15B are cross-sectional views showing a step that follows the step shown in FIG. 14A and FIG. 14B.
Figure 15B:
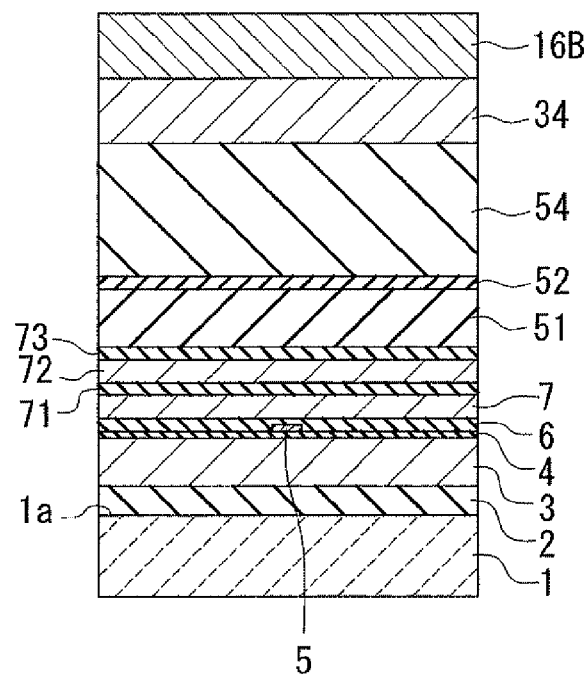

FIG. 15A and FIG. 15B show the next step. In this step, first, a photoresist mask (not-shown) is formed to cover the second shield 16B, the second connection layer, and part of the top surface of the nonmagnetic layer 57 contiguous with the first inclined surface 16Bb of the second shield 16B. This photoresist mask is formed by patterning a photoresist layer. Note that any photoresist mask to be employed in any subsequent step is formed in the same manner as this photoresist mask. Using this photoresist mask as an etching mask, part of the nonmagnetic layer 57 is then taper-etched by, for example, RIE, so as to provide the nonmagnetic layer 57 with the inclined surface and the bottom mentioned previously. The part of the top surface of the nonmagnetic layer 57 that is continuous with the first inclined surface 16Bb and covered with the photoresist mask becomes the flat portion mentioned previously. The shape of the bottom end 15L of the main pole 15 is thereby determined. The photoresist mask is then removed.

Figure 16A:
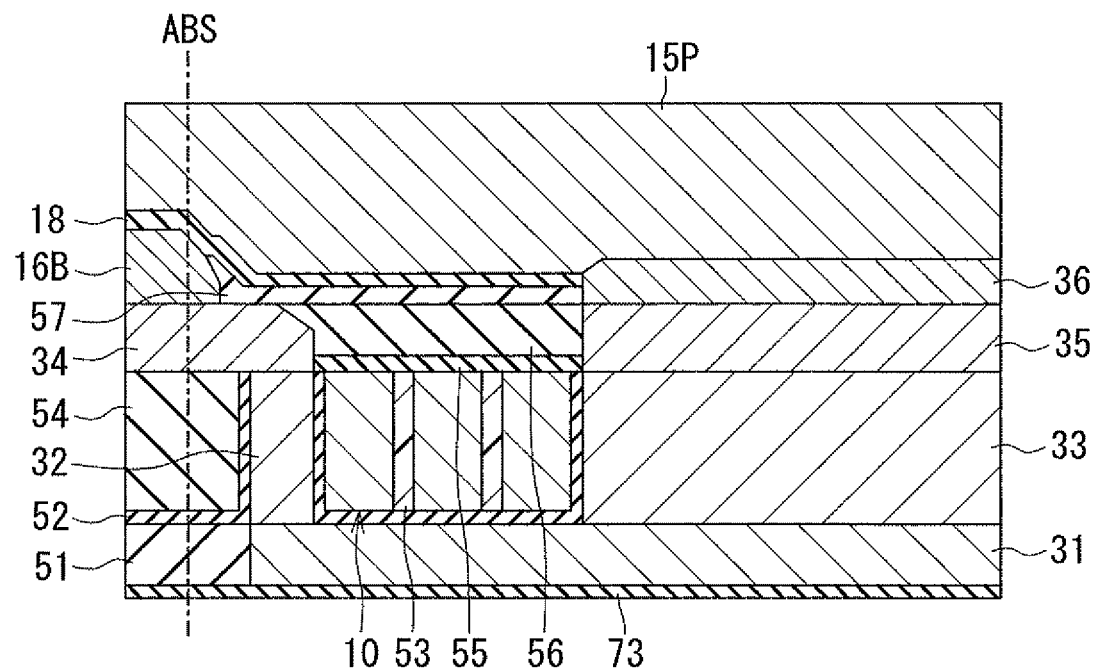
FIG. 16A and FIG. 16B are cross-sectional views showing a step that follows the step shown in FIG. 15A and FIG. 15B.
Figure 16B:
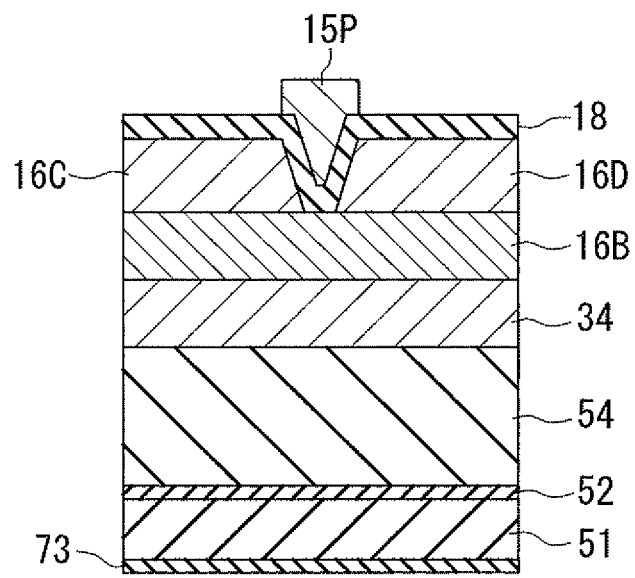

FIG. 16A and FIG. 16B show the next step. In this step, first, the side shields 16C and 16D are formed on the second shield 16B by frame plating, for example. The second gap layer 18 is then formed to cover the second shield 16B and the side shields 16C and 16D. Where alumina is selected as the material of the second gap layer 18, the second gap layer 18 is formed by atomic layer deposition, for example. Where Ru is selected as the material of the second gap layer 18, the second gap layer 18 is formed by chemical vapor deposition, for example.

Next, the second gap layer 18 is selectively etched to form therein an opening for exposing the top surface of the magnetic layer 36 and an opening for exposing the top surface of the second connection layer (not shown). Next, a magnetic layer 15P, which is to later become the main pole 15, and the third connection layer (not shown) are formed by frame plating, for example. The magnetic layer 15P and the third connection layer are formed such that their top surfaces are higher in level than portions of the second gap layer 18 that are located on the side shields 16C and 16D.

Figure 17A:
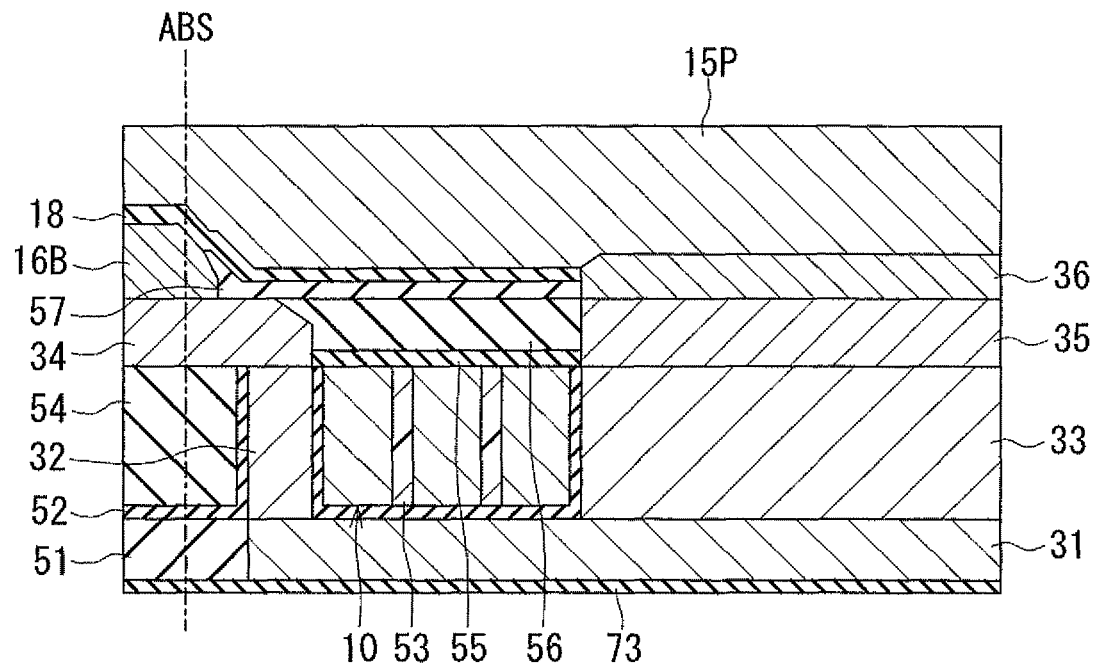
FIG. 17A and FIG. 17B are cross-sectional views showing a step that follows the step shown in FIG. 16A and FIG. 16B.
Figure 17B:
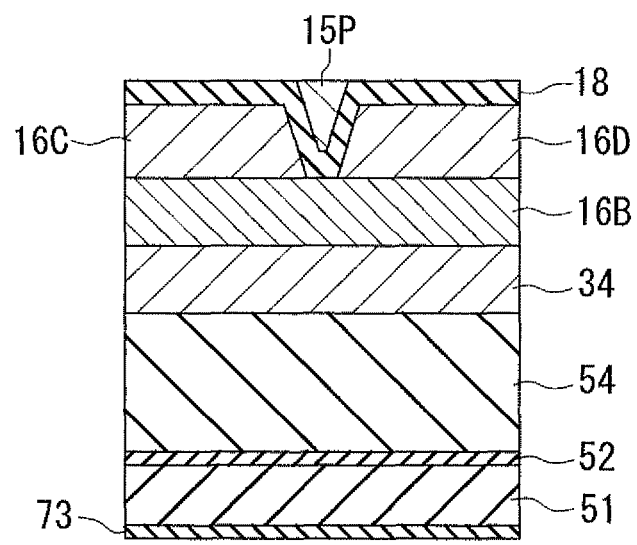

FIG. 17A and FIG. 17B show the next step. In this step, first, the first nonmagnetic layer (not shown) is formed over the entire top surface of the stack. The magnetic layer 15P, the third connection layer, and the first nonmagnetic layer are then polished by, for example, CMP, until the second gap layer 18 is exposed.

Figure 18A:
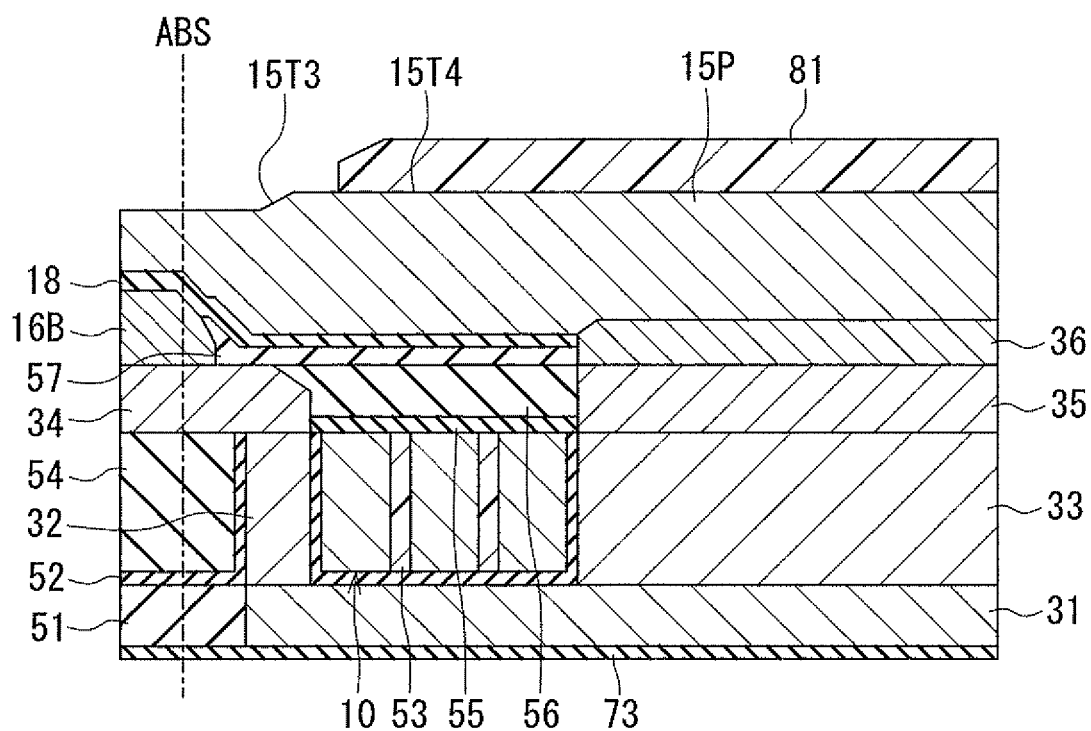
FIG. 18A and FIG. 18B are cross-sectional views showing a step that follows the step shown in FIG. 17A and FIG. 17B.
Figure 18B:
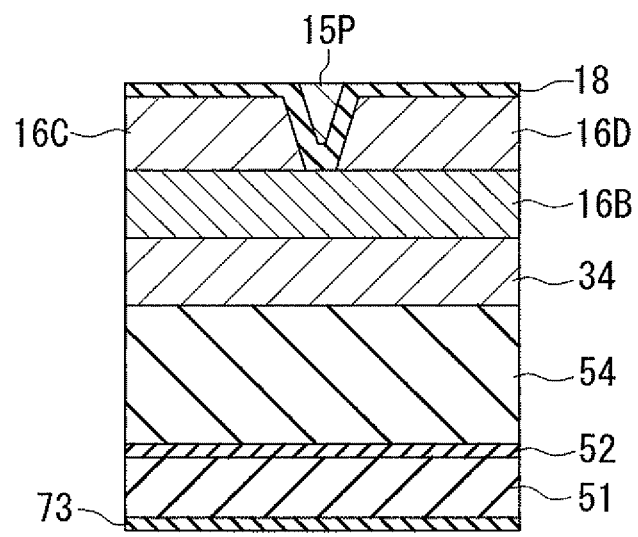

FIG. 18A and FIG. 18B show the next step. In this step, first, a photoresist mask 81 is formed on the magnetic layer 15P. The photoresist mask 81 covers a portion of the top surface of the magnetic layer 15P that is to later become the second flat portion 15T4, and does not cover a portion of the top surface of the magnetic layer 15P in the vicinity of the position ABS at which the medium facing surface 80 is to be formed.

Using the photoresist mask 81 as an etching mask, respective portions of the magnetic layer 15P and the second gap layer 18 are then etched in the vicinity of the position ABS at which the medium facing surface 80 is to be formed. This etching is performed to provide the magnetic layer 15P with the second inclined portion 15T3 as shown in FIG. 17A. More specifically, the magnetic layer 15P is etched by, for example, IBE with the direction of travel of the ion beams inclined relative to the direction perpendicular to the top surface 1a of the substrate 1. Performing IBE in such a manner forms the second inclined portion 15T3 into a plane inclined relative to the direction perpendicular to the medium facing surface 80 to be formed later. Then, the photoresist mask 81 is removed.

Figure 19A:
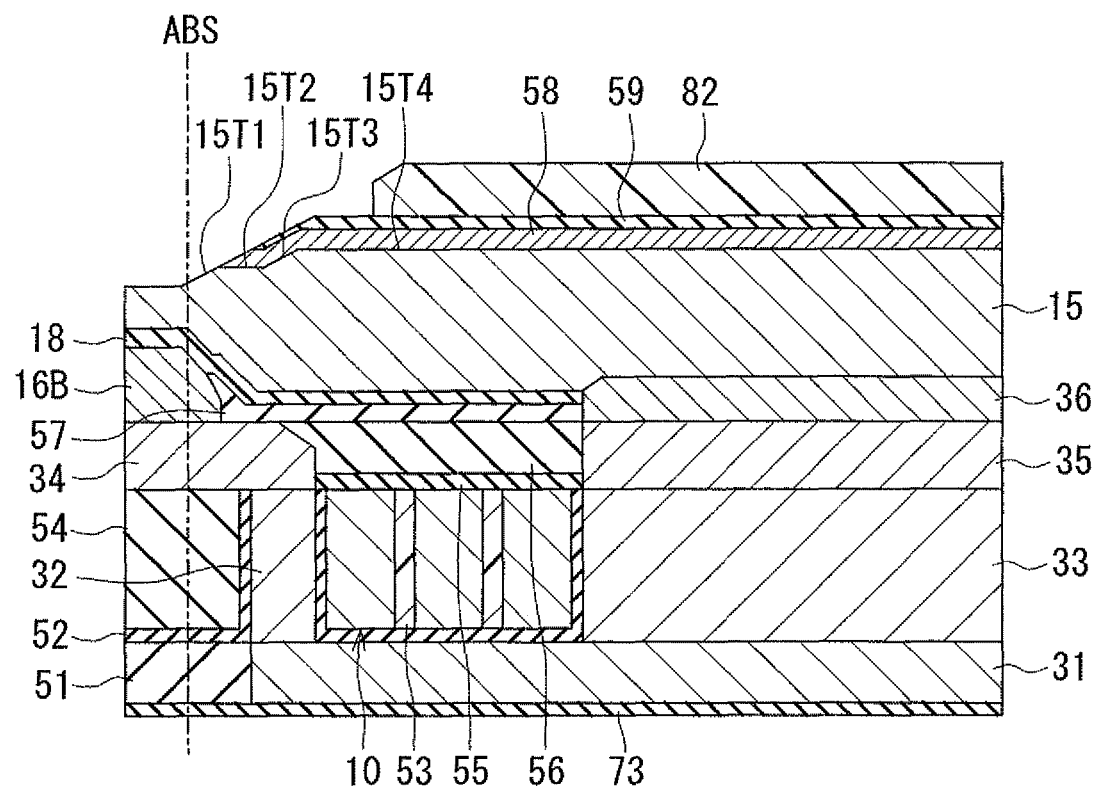
FIG. 19A and FIG. 19B are cross-sectional views showing a step that follows the step shown in FIG. 18A and FIG. 18B.
Figure 19B:
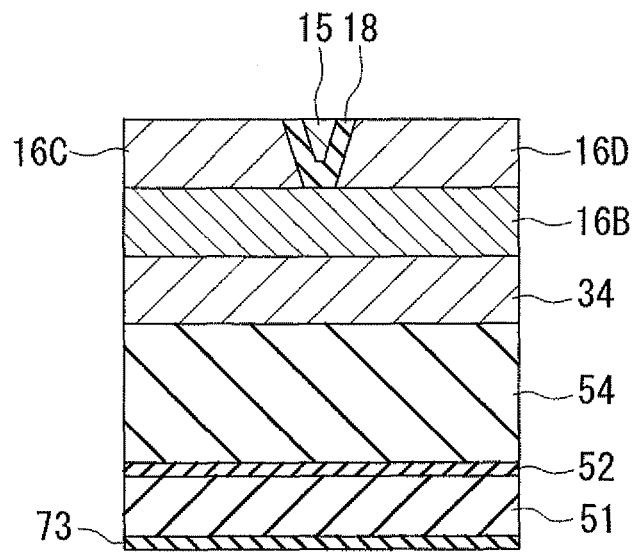

FIG. 19A and FIG. 19B show the next step. In this step, first, the nonmagnetic metal layer 58 and the insulating layer 59 are formed on the magnetic layer 15P. Next, a photoresist mask 82 is formed on the insulating layer 59. The photoresist mask 82 covers part of the insulating layer 59, and is not present in the position ABS at which the medium facing surface 80 is to be formed. Using the photoresist mask 82 as an etching mask, respective portions of the magnetic layer 15P, the side shields 16C and 16D, the second gap layer 18, the nonmagnetic metal layer 58, and the insulating layer 59 are then etched by IBE, for example. This makes the magnetic layer 15P into the main pole 15. The photoresist mask 82 is then removed.

Where IBE is employed to etch the portions of the magnetic layer 15P, the side shields 16C and 16D, the second gap layer 18, the nonmagnetic metal layer 58 and the insulating layer 59, the etching is performed such that the direction of travel of the ion beams is at an angle of 40° to 75° relative to the direction perpendicular to the top surface 1a of the substrate 1 and that the direction of travel of the ion beams is caused to rotate as viewed in the direction perpendicular to the top surface 1a of the substrate 1. Performing IBE in such a manner provides the magnetic layer 15P with a top surface having the first inclined portion 15T1 and the first flat portion 15T2.

Figure 20A:
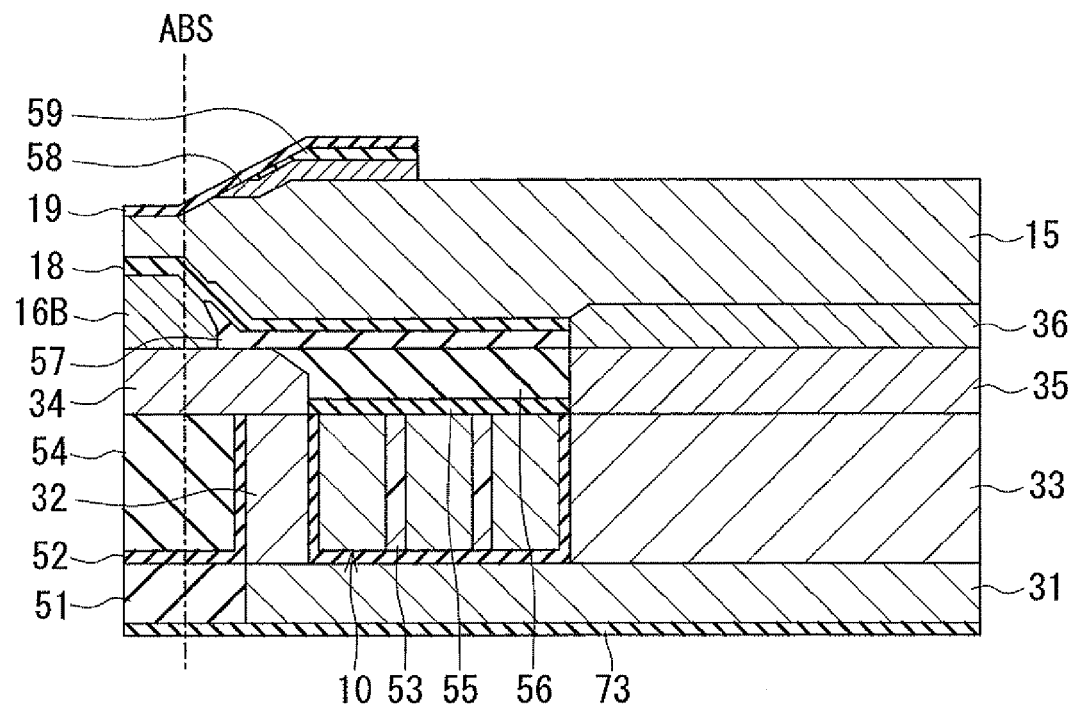
FIG. 20A and FIG. 20B are cross-sectional views showing a step that follows the step shown in FIG. 19A and FIG. 19B.
Figure 20B:
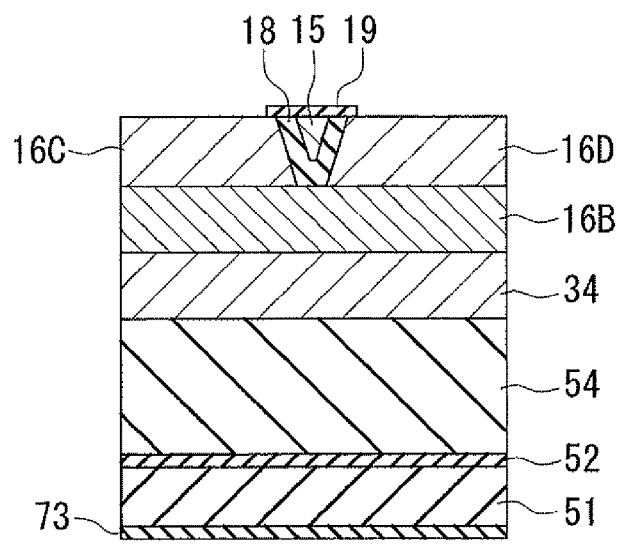

FIG. 20A and FIG. 20B show the next step. In this step, first, the first gap layer 19 is formed over the entire top surface of the stack by sputtering or chemical vapor deposition, for example. The first gap layer 19, the nonmagnetic metal layer 58, and the insulating layer 59 are then selectively etched by, for example, IBE, so that part of the top surface 15T of the main pole 15, part of the top surface of each of the side shields 16C and 16D, and the top surface of the third connection layer are exposed.

Figure 21A:
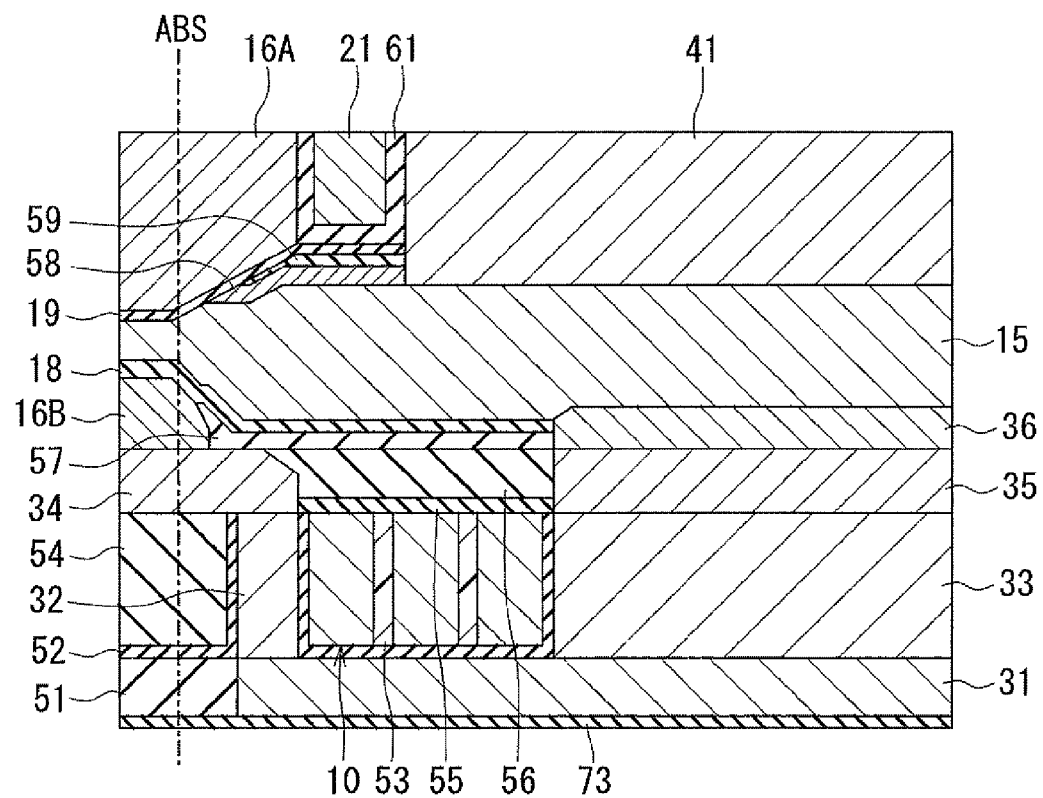
FIG. 21A and FIG. 21B are cross-sectional views showing a step that follows the step shown in FIG. 20A and FIG. 20B.
Figure 21B:
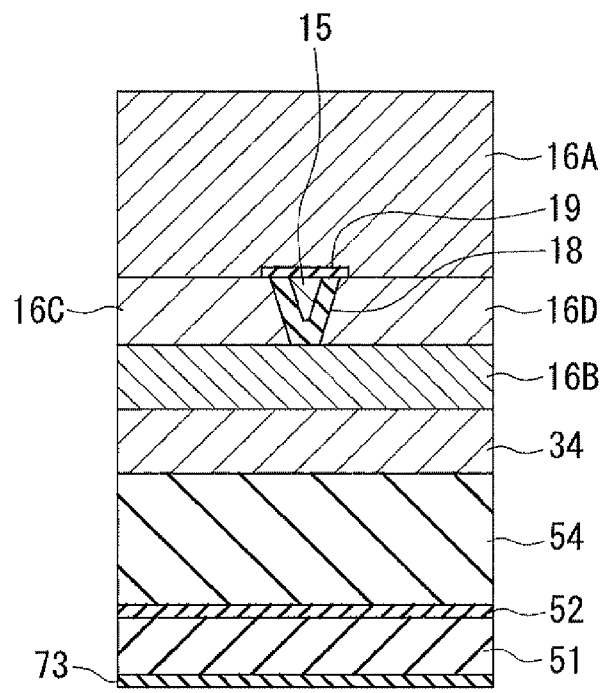

FIG. 21A and FIG. 21B show the next step. In this step, first, the first shield 16A is formed over the side shields 16C and 16D and the first gap layer 19, and the magnetic layer 41 is formed on the main pole 15, by performing frame plating, for example. Next, the insulating film 61 is formed over the entire top surface of the stack. Where alumina is selected as the material of the insulating film 61, the insulating film 61 is formed by atomic layer deposition, for example. Next, the insulating film 61 is selectively etched by, for example, IBE, so that the top surface of the third connection layer is exposed. The first layer 21 of the second portion 20 of the coil is then formed by frame plating, for example. The first layer 21 is formed such that its top surface is higher in level than portions of the insulating film 61 that are located on the first shield 16A and the magnetic layer 41. Next, the second nonmagnetic layer (not shown) is formed over the entire top surface of the stack. The first layer 21, the insulating film 61, and the second nonmagnetic layer are then polished by, for example, CMP, until the first shield 16A and the magnetic layer 41 are exposed. The top surfaces of the first shield 16A, the first layer 21, the magnetic layer 41, the insulating film 61, and the second nonmagnetic layer are thereby made even with each other.

Figure 22A:
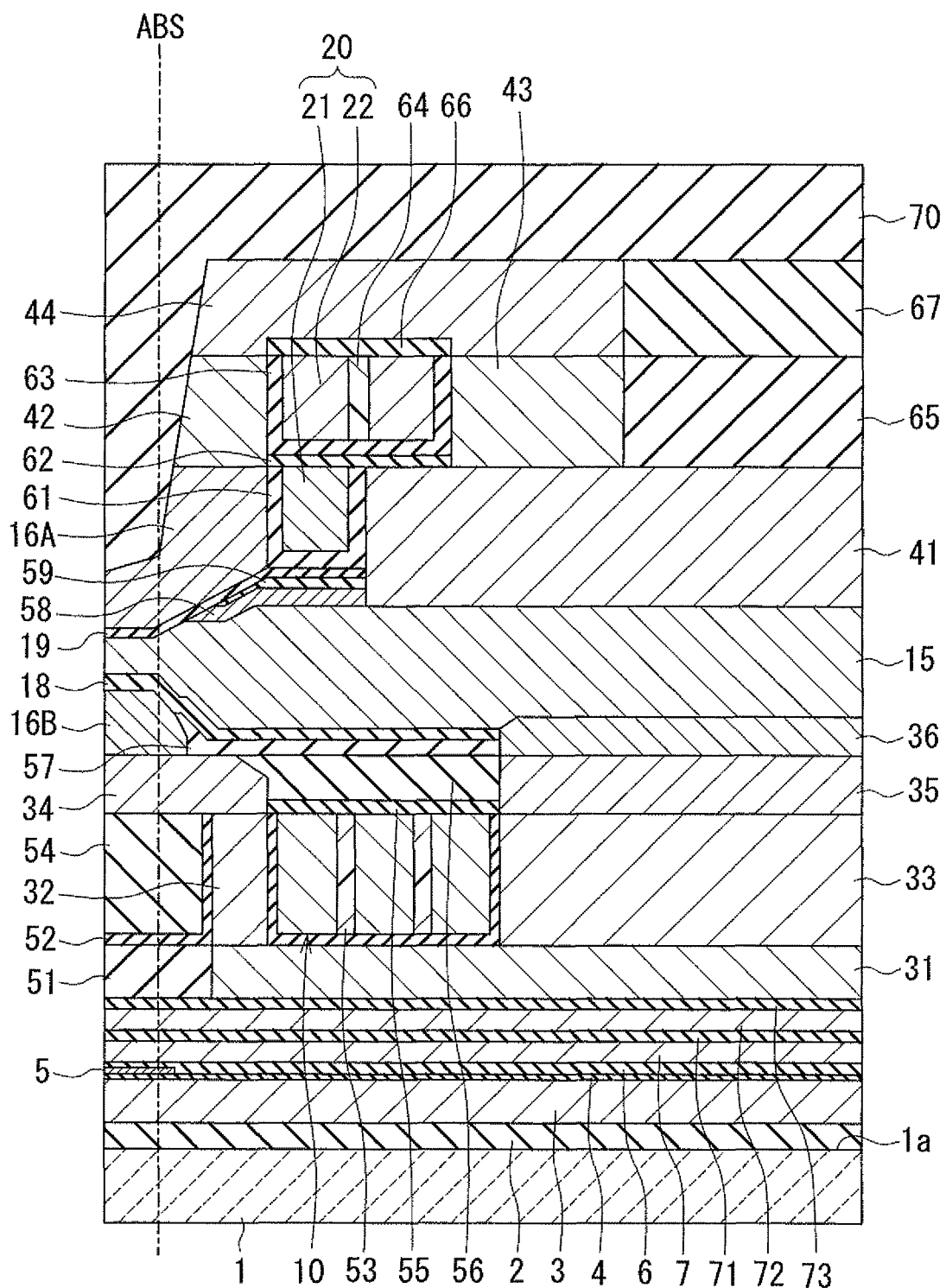
FIG. 22A and FIG. 22B are cross-sectional views showing a step that follows the step shown in FIG. 21A and FIG. 21B.
Figure 22B:
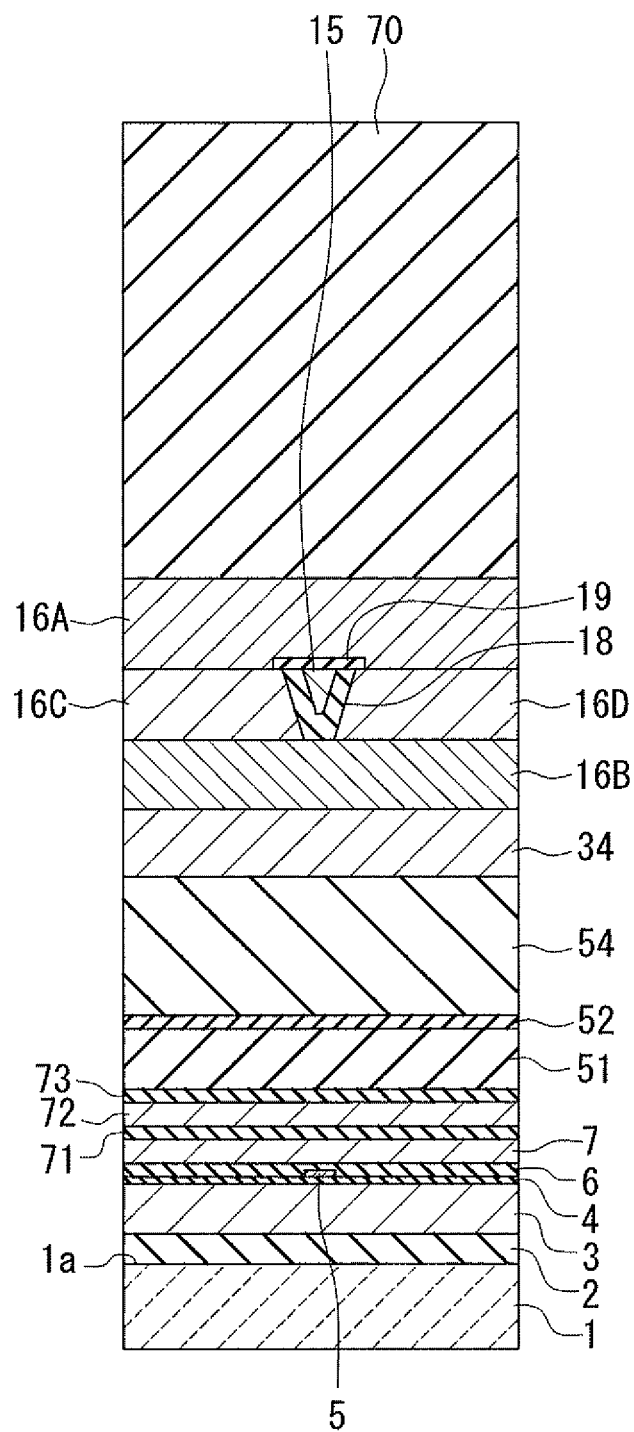

FIG. 22A and FIG. 22B show the next step. In this step, first, the insulating layer 62 is formed over the entire top surface of the stack. The insulating layer 62 is then selectively etched by, for example, IBE, so that the top surface of the first shield 16A and part of the top surface of the magnetic layer 41 are exposed. Then, the magnetic layer 42 is formed on the first shield 16A, and the magnetic layer 43 is formed on the magnetic layer 41, by performing frame plating, for example. The insulating film 63 is then formed over the entire top surface of the stack. Where alumina is selected as the material of the insulating film 63, the insulating film 63 is formed by atomic layer deposition, for example. Next, the insulating layer 62 and the insulating film 63 are selectively etched by, for example, IBE, so that the coil connection part 21E (see FIG. 5) of the first layer 21 is exposed.

Next, the second layer 22 of the second portion 20 of the coil and the insulating layer 64 are formed. The second layer 22 and the insulating layer 64 are formed in the same manner as the first portion 10 of the coil and the insulating layer 53. Next, the insulating layer 65 is formed over the entire top surface of the stack. The second layer 22, the insulating film 63, and the insulating layers 64 and 65 are then polished by, for example, CMP, until the magnetic layers 42 and 43 are exposed. The top surfaces of the magnetic layers 42 and 43, the second layer 22, the insulating film 63, and the insulating layers 64 and 65 are thereby made even with each other.

Next, the insulating layer 66 is formed over the top surfaces of the second layer 22, the insulating film 63, and the insulating layer 64. The magnetic layer 44 is then formed over the magnetic layers 42 and 43 and the insulating layer 66 by frame plating, for example. Next, the insulating layer 67 is formed over the entire top surface of the stack. The insulating layer 67 is then polished by, for example, CMP, until the magnetic layer 44 is exposed. The top surfaces of the magnetic layer 44 and the insulating layer 67 are thereby made even with each other.

Then, a photoresist mask (not shown) is formed on the top surface of the stack. The photoresist mask is not present in the position ABS at which the medium facing surface 80 is to be formed, but is present on a portion of the stack that is to remain as the magnetic head (the portion located on the right side relative to the position ABS in FIG. 22A) and covers part of the magnetic layer 44. Using this photoresist mask as an etching mask, respective portions of the first shield 16A and the magnetic layers 42 and 44 are then etched by IBE, for example. The photoresist mask is then removed.

Next, the protective layer 70 is formed to cover the entire top surface of the stack. Wiring, terminals and other components are then formed on the protective layer 70, and the substrate 1 is cut near the position at which the medium facing surface 80 is to be formed. The cut surface is polished into the medium facing surface 80, and then fabrication of flying rails and other processes are performed to complete the magnetic head.

Second Embodiment

Figure 23:
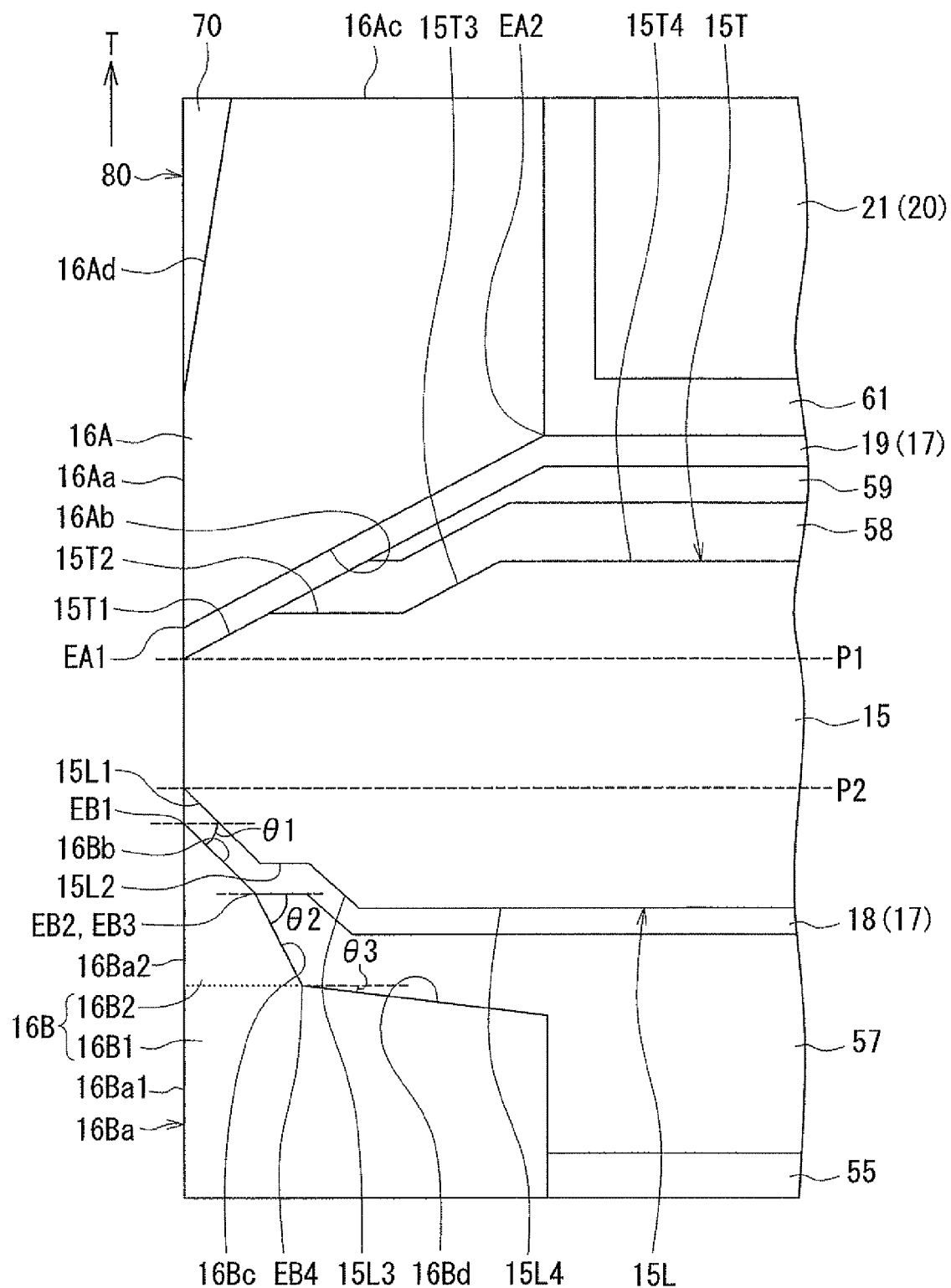
FIG. 23 is a cross-sectional view showing a write shield and a portion of a main pole in the vicinity of the medium facing surface in a magnetic head according to a second embodiment of the invention.
Figure 24:
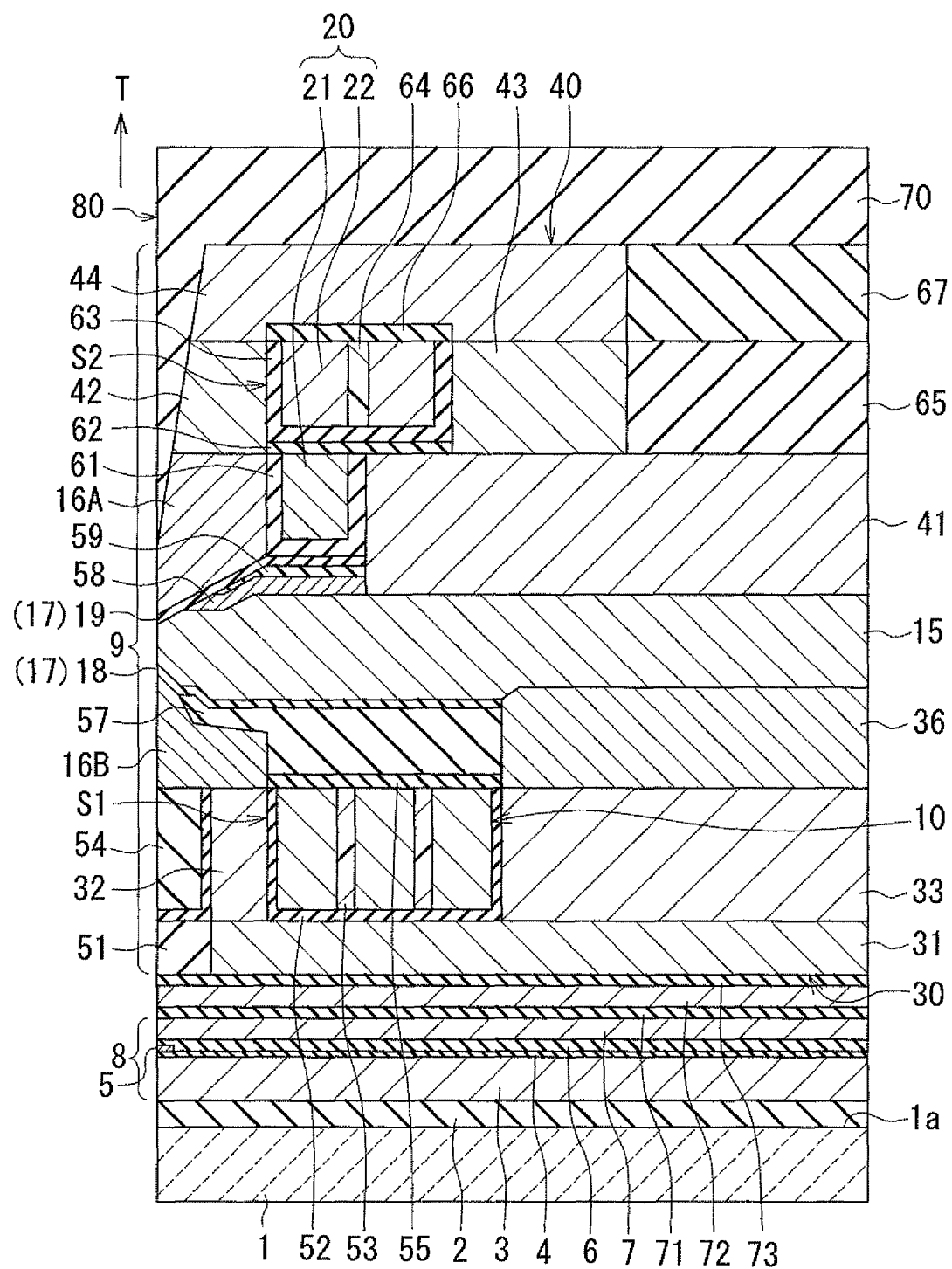
FIG. 24 is a cross-sectional view of the magnetic head according to the second embodiment of the invention.
Figure 25:
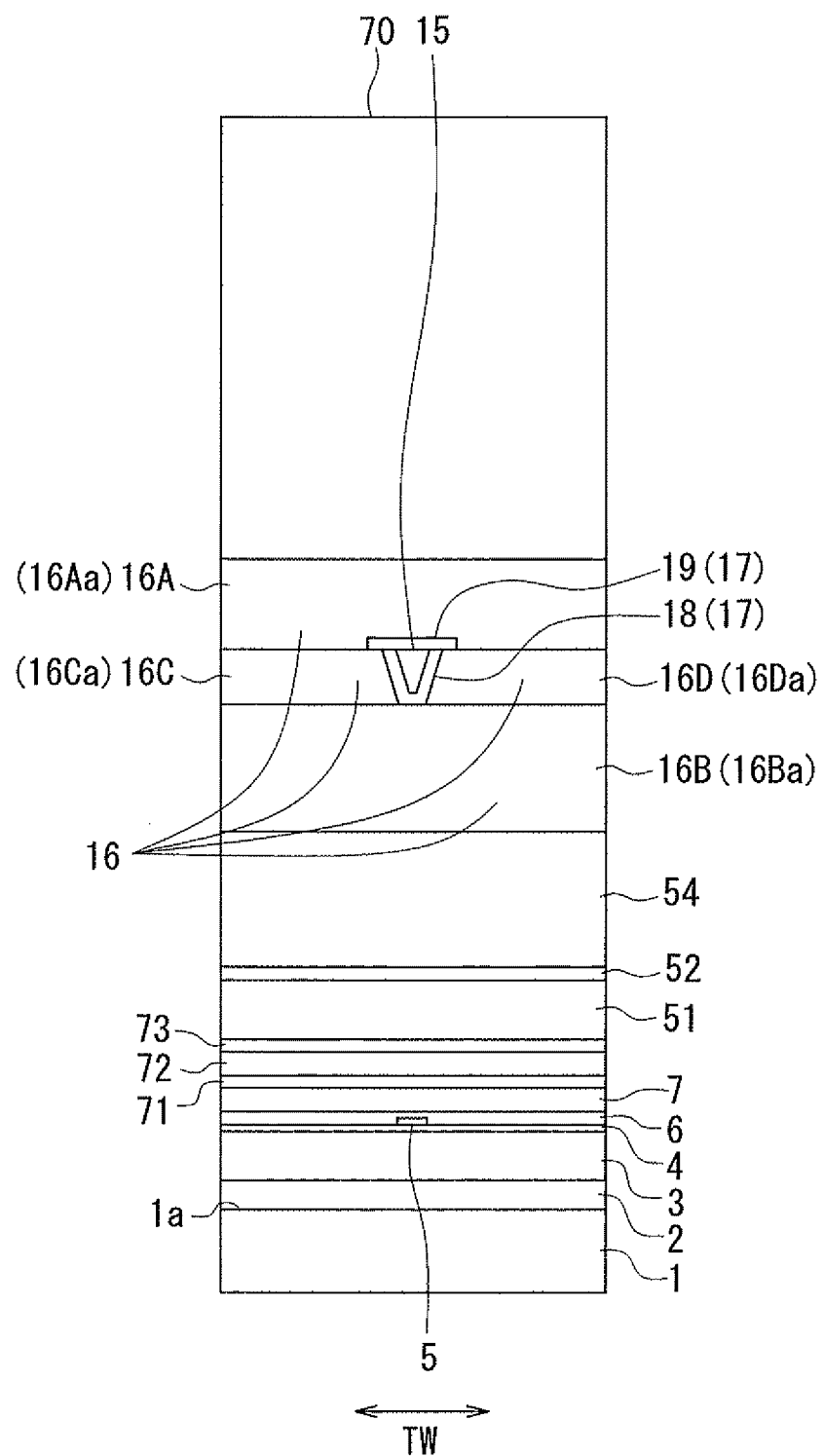
FIG. 25 is a front view showing the medium facing surface of the magnetic head according to the second embodiment of the invention.

A magnetic head according to a second embodiment of the invention will now be described with reference to FIG. 23 to FIG. 25. FIG. 23 is a cross-sectional view showing the write shield and a portion of the main pole in the vicinity of the medium facing surface in the magnetic head according to the present embodiment. FIG. 24 is a cross-sectional view of the magnetic head according to the present embodiment. Note that FIG. 23 and FIG. 24 each show the main cross section. FIG. 25 is a front view showing the medium facing surface of the magnetic head according to the present embodiment.

The magnetic head according to the present embodiment is different from the magnetic head according to the first embodiment in the following respects. In the magnetic head according to the present embodiment, there are not provided the magnetic layers 34 and 35, the insulating layer 56, and the first connection layer. The second shield 16B is disposed over the magnetic layer 32 and the insulating layer 54. The magnetic layer 36 is disposed on the magnetic layer 33. The nonmagnetic layer 57 is disposed on the insulating layer 55. The second connection layer is disposed on the coil connection part 10E (see FIG. 4) of the first portion 10 of the coil.

In the present embodiment, the second shield 16B includes a base part 16B1 and a protruding part 16B2. The protruding part 16B2 protrudes from the base part 16B1 toward the main pole 15. In FIG. 23, the boundary between the base part 16B1 and the protruding part 16B2 is shown, by a dotted line. The base part 16B1 is in contact with the top surface of the magnetic layer 32 and magnetically connected to the magnetic layer 32. In the main cross section, the base part 16B1 is greater than the protruding part 16B2 in length in the direction perpendicular to the medium facing surface 80.

The base part 16B1 has: a front end face 16Ba1 constituting a part of the second end face portion 16Ba of the second shield 16B; and a top surface 16Bd facing toward the main pole 15. The protruding part 16B2 has: a front end face 16Ba2 constituting another part of the second end face portion 16Ba of the second shield 16B; and the first and second inclined surfaces 16Bb and 16Bc mentioned in the description of the first embodiment. The top surface 16Bd of the base part 16B1 is located farther from the medium facing surface 80 than is the second inclined surface 16Bc of the protruding part 16B2, and is contiguous with the second inclined surface 16Bc. The top surface 16Bd of the base part 16B1 may be inclined relative to the first and second virtual planes P1 and P2 and the medium facing surface 80, or may be substantially parallel to the first and second virtual planes P1 and P2. Where the top surface 16Bd is inclined relative to the first and second virtual planes P1 and P2 and the medium facing surface 80, the inclination is preferably such that the distance from the top surface 1a of the substrate 1 to an arbitrary point on the top surface 16Bd decreases with increasing distance from the arbitrary point to the medium facing surface 80.

Here, the angle that the top surface 16Bd of the base part 16B1 forms relative to the direction perpendicular to the medium facing surface 80 will be represented by the symbol $\theta 3$. The angle $\theta 2$ formed by the second inclined surface 16Bc relative to the direction perpendicular to the medium facing surface 80 is greater than the angle $\theta 3$. The angle $\theta 3$ preferably falls within the range of 0° to 20°.

The effects of the present embodiment will now be described. In the present embodiment, no end face of the first return path section 30 is exposed in the medium facing surface 80. More specifically, in the present embodiment, the magnetic layer 34 is not provided. The magnetic layer 32 constituting part of the first return path section 30 is interposed between the first space S1 and the medium facing surface 80 without being exposed in the medium facing surface 80, and magnetically couples the second shield 16B and the magnetic layer 31 to each other. In the present embodiment, the second shield 16B includes the base part 16B1 and the protruding part 16B2, in particular. In the main cross section, the base part 16B1 is greater than the protruding part 16B2 in length in the direction perpendicular to the medium facing surface 80. The magnetic layer 32 is thus able to magnetically couple the base part 16B1 of the second shield 16B and the magnetic layer 31 to each other without being exposed in the medium facing surface 80. Consequently, like the first embodiment, the present embodiment makes it possible to avoid the problems resulting from the configuration in which an end face of the first return path section is exposed over a large area in the medium facing surface 80.

Furthermore, according to the present embodiment, the configuration in which the second shield 16B includes the base part 16B1 and the protruding part 16B2 eliminates the need for the magnetic layer 34 for magnetically coupling the second shield 16B and the magnetic layer 32 to each other. This makes it possible to manufacture the magnetic head in a smaller number of steps than in the first embodiment. If the magnetic layer 34 exists, an end of a seed layer for forming the second shield 16B by plating should exist between the second end face portion 16Ba of the second shield 16B and the magnetic layer 34, so that there tends to be magnetic field leakage from the inside to the outside of the second shield 16B and the magnetic layer 34. This may result in the occurrence of adjacent track erasure. According to the present embodiment, since the magnetic layer 34 is not required, it is possible to prevent the occurrence of adjacent track erasure associated with the seed layer.

A method of manufacturing the magnetic head according to the present embodiment will now be described with reference to FIG. 26 to FIG. 30. FIG. 26 to FIG. 30 each show a stack of layers formed in the process of manufacturing the magnetic head. Note that FIG. 26 to FIG. 30 each show the main cross section. The symbol "ABS" in FIG. 26 to FIG. 30 indicates the position at which the medium facing surface 80 is to be formed. FIG. 26 to FIG. 30 omit portions located below the nonmagnetic layer 73.

Figure 26:
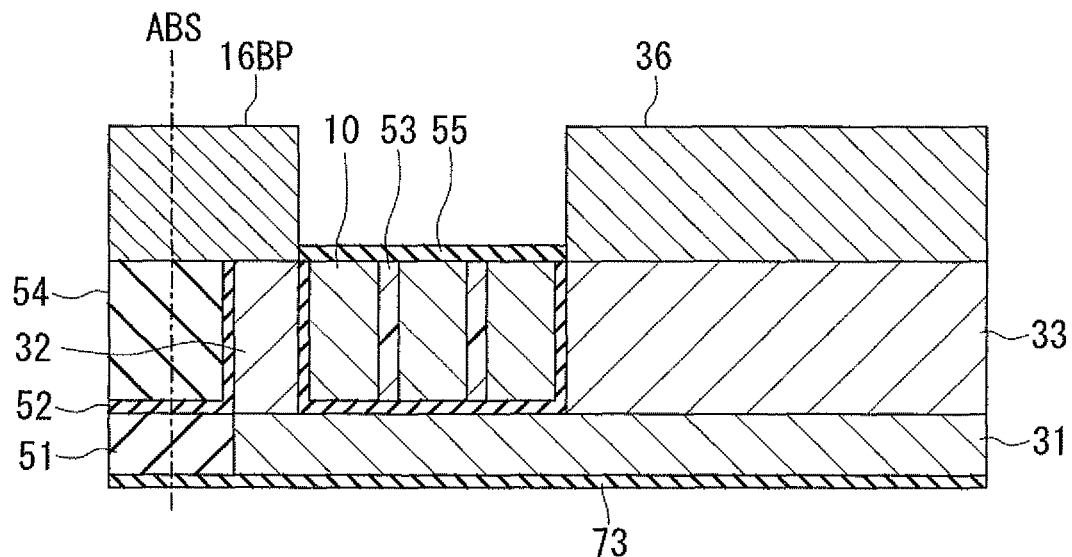
FIG. 26 is a cross-sectional view showing a step of a method of manufacturing the magnetic head according to the second embodiment of the invention.

The method of manufacturing the magnetic head according to the present embodiment is the same as the method according to the first embodiment up to the step of forming the insulating layer 55. In the next step of the present embodiment, as shown in FIG. 26, the magnetic layer 16BP is formed on the magnetic layer 34, the magnetic layer 36 is formed on the magnetic layer 33, and the second connection layer (not shown) is formed on the coil connection part 10E (see FIG. 4) of the first portion 10, by performing frame plating, for example. The magnetic layer 16BP is to become the second shield 16B later.

Figure 27:
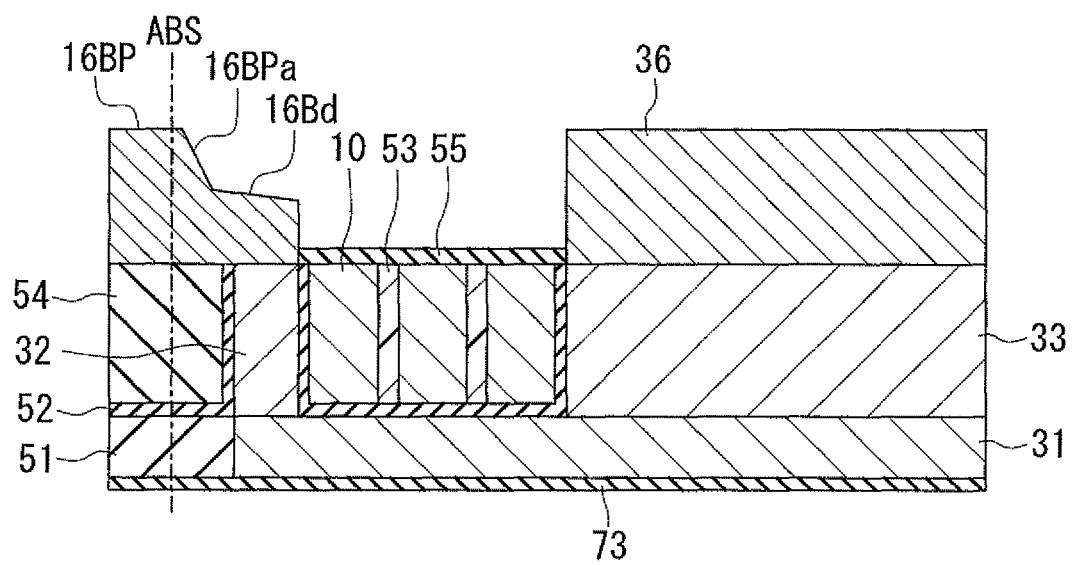
FIG. 27 is a cross-sectional view showing a step that follows the step shown in FIG. 26.

FIG. 27 shows the next step. In this step, part of the magnetic layer 16BP is taper-etched by, for example, IBE, so as to provide the magnetic layer 16BP with an inclined surface 16BPa and the top surface 16Bd of the base part 16B1. The inclined surface 16BPa includes a portion to become the second inclined surface 16Bc later.

Figure 28:
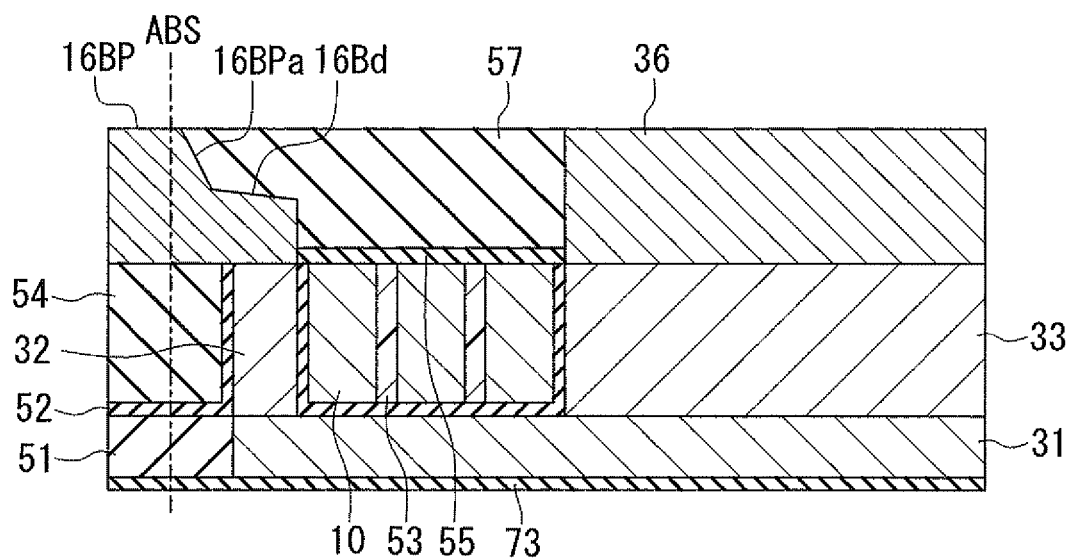
FIG. 28 is a cross-sectional view showing a step that follows the step shown in FIG. 27.

FIG. 28 shows the next step. In this step, first, the nonmagnetic layer 57 is formed over the entire top surface of the stack. The nonmagnetic layer 57 is then polished by, for example, CMP, until the magnetic layers 16BP and 36 and the second connection layer are exposed. The top surfaces of the magnetic layers 16BP and 36, the second connection layer, and the nonmagnetic layer 57 are thereby made even with each other.

Figure 29:
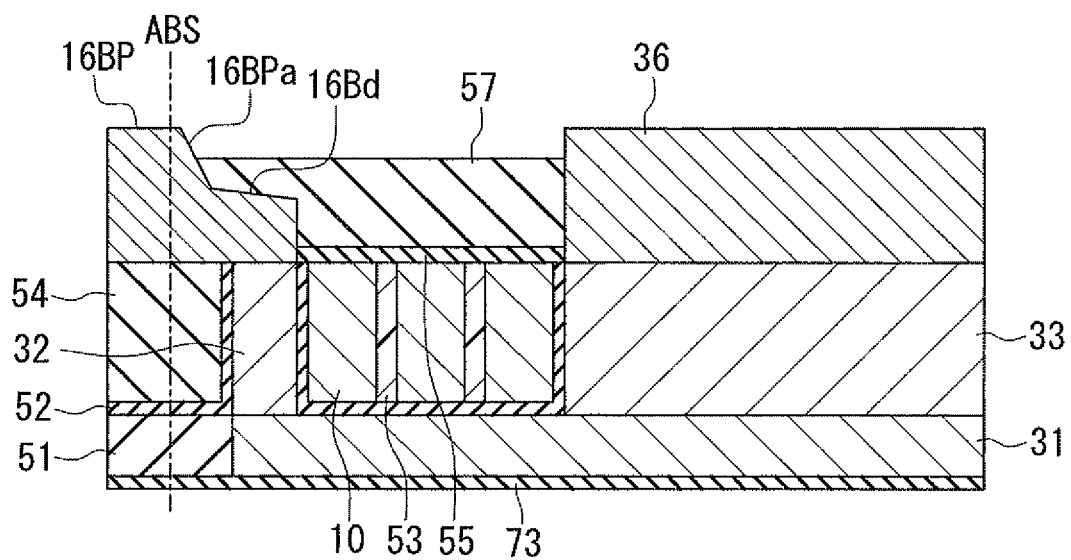
FIG. 29 is a cross-sectional view showing a step that follows the step shown in FIG. 28.

FIG. 29 shows the next step. In this step, first, part of the nonmagnetic layer 57 is etched by, for example, RIE, so as to expose an area of the inclined surface 16BPa of the magnetic layer 16BP where the first inclined surface 16BP is to be formed later.

Figure 30:
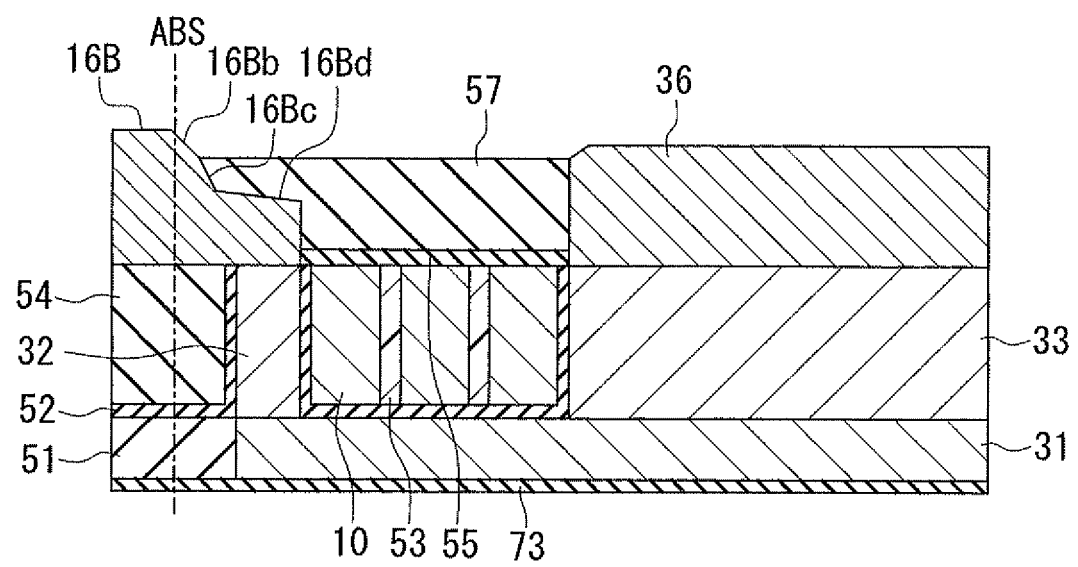
FIG. 30 is a cross-sectional view showing a step that follows the step shown in FIG. 29.

FIG. 30 shows the next step. In this step, first, part of the inclined surface 16BPa of the magnetic layer 16BP is taper-etched by, for example, IBE, so that the magnetic layer 16BP is provided with the first inclined surface 16Bb. The rest of the inclined surface 16BPa remaining after this etching makes the second inclined surface 16Bc. The magnetic layer 16BP thereby becomes the second shield 16B. Next, part of the magnetic layer 36 is etched by, for example, RIE, so as to chamfer corners at the edge of the top surface of the magnetic layer 36. The subsequent steps are the same as those in the first embodiment.

The remainder of configuration, function and effects of the present embodiment are similar to those of the first embodiment.

Third Embodiment

Figure 31:
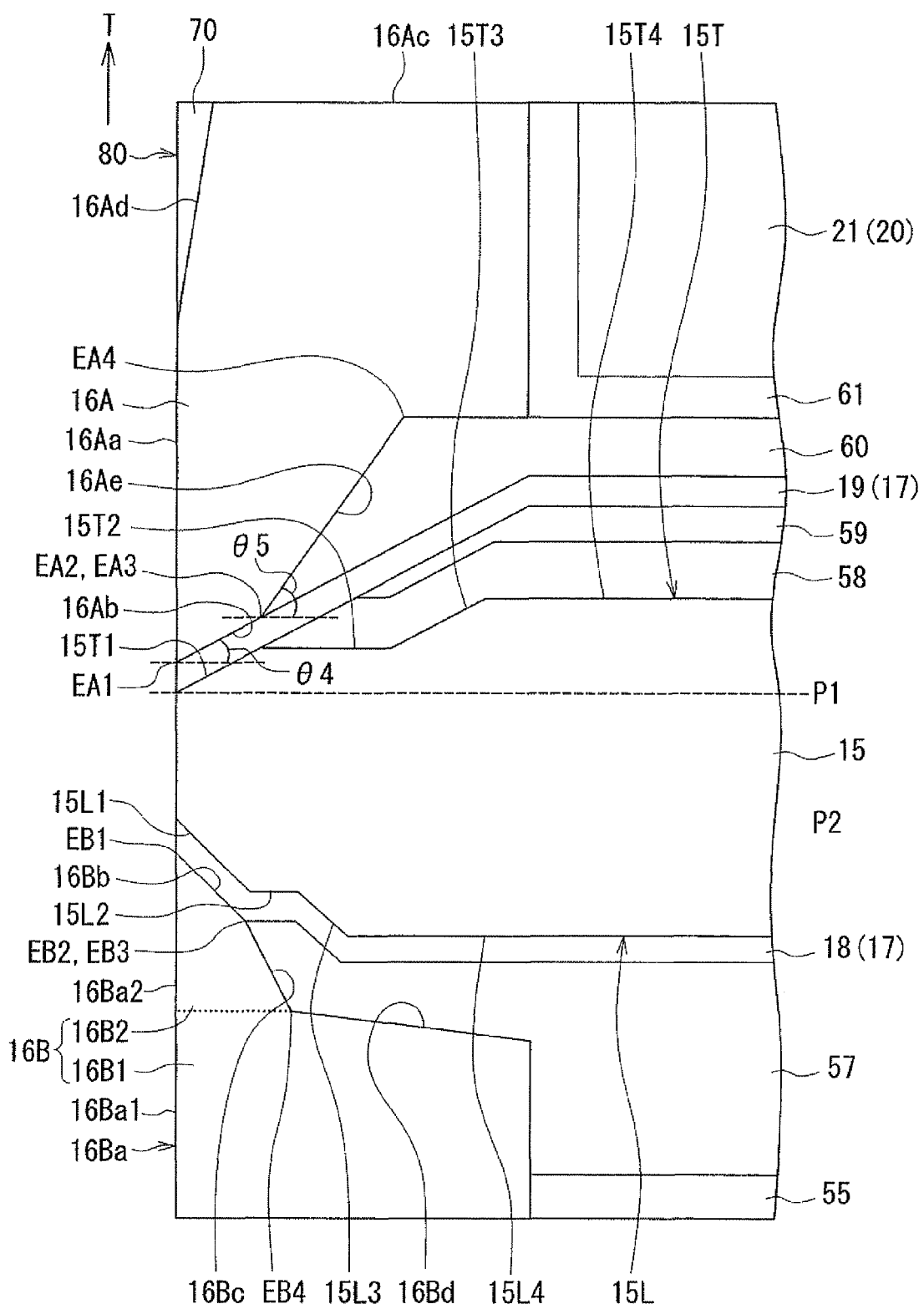
FIG. 31 is a cross-sectional view showing a write shield and a portion of a main pole in the vicinity of the medium facing surface in a magnetic head according to a third embodiment of the invention.
Figure 32:
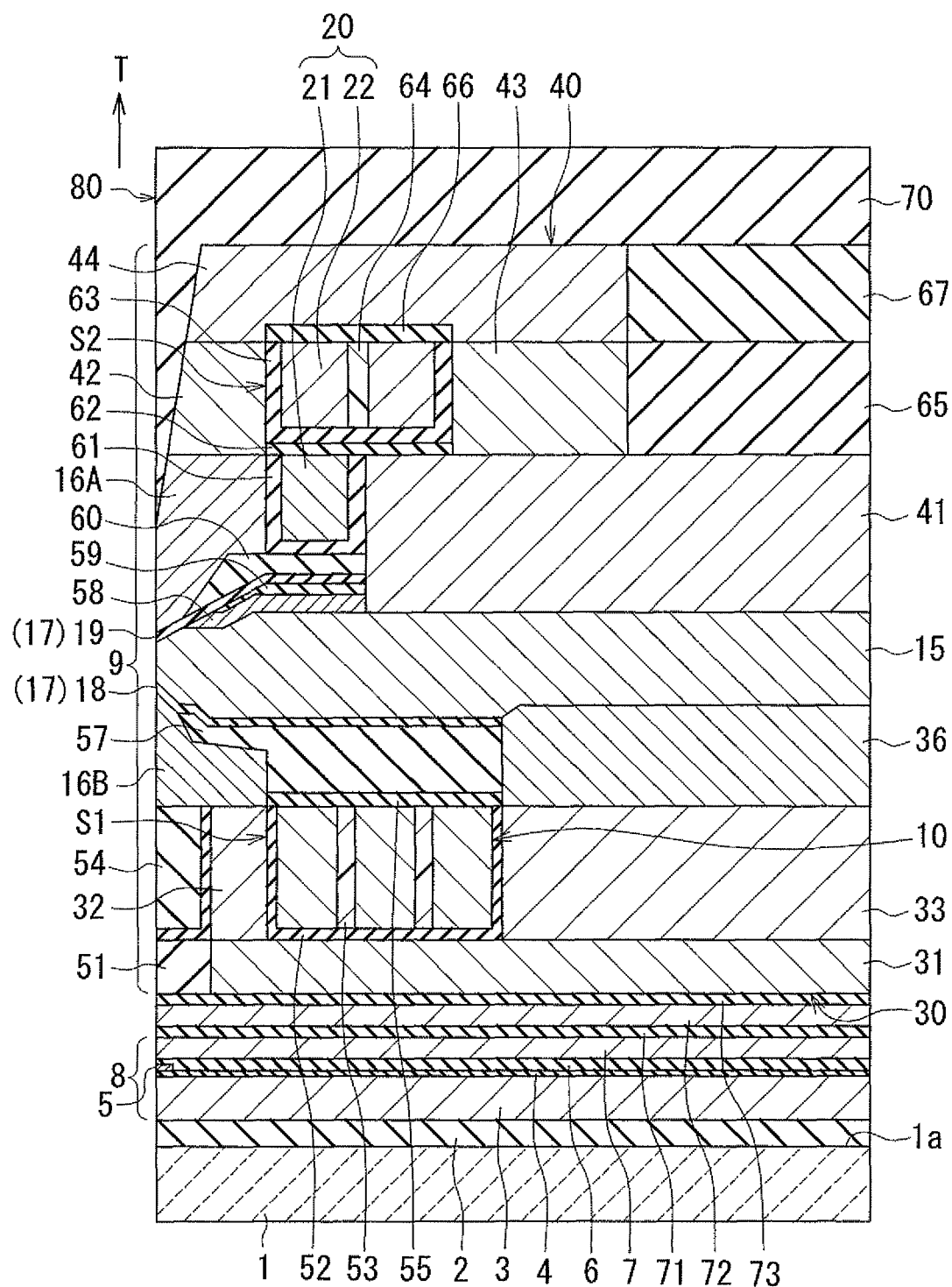
FIG. 32 is a cross-sectional view of the magnetic head according to the third embodiment of the invention.

A magnetic head according to a third embodiment of the invention will now be described with reference to FIG. 31 and FIG. 32. FIG. 31 is a cross-sectional view showing the write shield and a portion of the main pole in the vicinity of the medium facing surface in the magnetic head according to the present embodiment. FIG. 32 is a cross-sectional view of the magnetic head according to the present embodiment. Note that FIG. 31 and FIG. 32 each show the main cross section.

The magnetic head according to the present embodiment is different from the magnetic head according to the second embodiment in the following respects. The magnetic head according to the present embodiment includes an insulating layer 60 made of an insulating material and disposed on the first gap layer 19 at a position away from the medium facing surface 80. The insulating layer 60 is interposed between the first gap layer 19 and each of the first shield 16A and the insulating film 61. The insulating layer 60 has an end face facing toward the medium facing surface 80, the end face being located at a distance from the medium facing surface 80. The distance from the medium facing surface 80 to an arbitrary point on the end face of the insulating layer 60 increases with increasing distance from the arbitrary point to the top surface 1a of the substrate 1. The insulating layer 60 is made of alumina, for example.

In the present embodiment, as shown in FIG. 31, the first shield 16A has a second inclined surface 16Ae, in addition to the first end face portion 16Aa, the first incline surface 16Ab, the top surface 16Ac, and the connecting surface 16Ad. The second inclined surface 16Ae is located farther from the medium facing surface 80 than is the first inclined surface 16Ab, and is contiguous with the first inclined surface 16Ab. The insulating layer 60 is interposed between the second inclined surface 16Ae and the first gap layer 19.

The second inclined surface 16Ae has a third end EA3 connected to the second end EA2 of the first inclined surface 16Ab and a fourth end EA4 opposite to the third end EA3. The second inclined surface 16Ae is inclined relative to the first and second virtual planes P1 and P2 and the medium facing surface 80 such that the fourth end EA4 is located farther from the first and second virtual planes P1 and P2 than is the third end EA3. In other words, the second inclined surface 16Ae is inclined such that the fourth end EA4 is located on the front side in the direction T of travel of the recording medium relative to the third end EA3.

As shown in FIG. 31, the angle that the first inclined surface 16Ab forms relative to the direction perpendicular to the medium facing surface 80 will be represented by the symbol θ4, and the angle that the second inclined surface 16Ae forms relative to the direction perpendicular to the medium facing surface 80 will be represented by the symbol θ5. The angle θ5 is greater than the angle θ4. The angle θ4 preferably falls within the range of 30° to 45°, for example. The angle θ5 preferably falls within the range of 50° to 65°, for example. The distance between the main pole 15 and an arbitrary point on the second inclined surface 16Ae increases with decreasing distance between the arbitrary point and the fourth end EA4.

Now, a method of forming the insulating layer 60 and the first shield 16A of the present embodiment will be described briefly by way of example. The step of forming the insulating layer 60 is performed after the step of forming the first gap layer 19 over the entire top surface of the stack, which has been described in relation to the first embodiment. In the step of forming the insulating layer 60, first; a photoresist mask is formed on the first gap layer 19. This photoresist mask covers at least the vicinity of the position at which the medium facing surface 80 is to be formed. Next, the insulating layer 60 is formed over the entire top surface of the stack. The photoresist mask is then lifted off. Next, part of the insulating layer 60 is taper-etched by, for example, IBE, so as to provide the insulating layer 60 with the aforementioned end face. Then, the first gap layer 19, the nonmagnetic metal layer 58, and the insulating layers 59 and 60 are selectively etched by, for example, IBE, so that part of the top surface 15T of the main pole 15, part of the top surface of each of the side shields 16C and 16D, and the top surface of the third connection layer are exposed.

Next, the step of forming the first shield 16A is performed. Specifically, the first shield 16A is formed over the side shields 16C and 16D, the first gap layer 19 and the insulating layer 60 by frame plating, for example. The first shield 16A is thereby provided with the first and second inclined surfaces 16Ab and 16Ae mentioned previously.

In the present embodiment, the first shield 16A of the write shield 16 has the first and second inclined surfaces 16Ab and 16Ae which are inclined relative to the first and second virtual planes P1 and P2 and the medium facing surface 80. The angle θ5 that the second inclined surface 16Ae forms relative to the direction perpendicular to the medium facing surface 80 is greater than the angle θ4 that the first inclined surface 16Ab forms relative to the direction perpendicular to the medium facing surface 80, and the distance between the main pole 15 and an arbitrary point on the second inclined surface 16Ae increases with decreasing distance between the arbitrary point and the fourth end EA4. This makes it possible to suppress magnetic flux leakage from the main pole 15 to the first shield 16A. Furthermore, the configuration in which the second inclined surface 16Ae is inclined relative to the first and second virtual planes P1 and P2 and the medium facing surface 80 allows the first shield 16A to be greater in volume than in the case where the angle θ5 is 90°, thereby allowing the prevention of magnetic flux saturation in the write shield 16. Consequently, according to the present embodiment, it is possible to prevent the skew-induced problems and provide improved write characteristics without compromising the function of the write shield 16 (the first shield 16A).

The remainder of configuration, function and effects of the present embodiment are similar to those of the second embodiment.

The present invention is not limited to the foregoing embodiments, and various modifications may be made thereto. For example, the magnetic head may be provided with either one of the first and second return path sections 30 and 40. Further, either one of the top surface 15T and the bottom end 15L of the main pole 15 may have the inclined portion (the first inclined portion).

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:

a medium facing surface that faces a recording medium;

a coil that produces a magnetic field corresponding to data to be written on a recording medium;

a main pole that has an end face located in the medium facing surface, the main pole allowing a magnetic flux that corresponds to the magnetic field produced by the coil to pass, and producing a write magnetic field for writing the data on a recording medium by means of a perpendicular magnetic recording system;

a write shield made of a magnetic material and having an end face located in the medium facing surface; and a gap part made of a nonmagnetic material and interposed between the main pole and the write shield, wherein:

the end face of the write shield includes a first end face portion that is located on a front side in a direction of travel of a recording medium relative to the end face of the main pole;

the main pole has a top surface, and a bottom end opposite to the top surface, the top surface being a surface located at an end on the front side in the direction of travel of a recording medium;

at least one of the top surface and the bottom end of the main pole includes an inclined portion;

the inclined portion has a front end located in the medium facing surface and a rear end opposite to the front end;

for a first virtual plane and a second virtual plane, the first virtual plane passing through an end of the end face of the main pole located on the front side in the direction of travel of a recording medium and being perpendicular to the medium facing surface and to the direction of travel of a recording medium, the second virtual plane passing through an end of the end face of the main pole located on a rear side in the direction of travel of a recording medium and being perpendicular to the medium facing surface and to the direction of travel of a recording medium, the inclined portion is inclined relative to the first and second virtual planes and the medium facing surface such that the rear end is located farther from the first and second virtual planes than is the front end;

the write shield has a first inclined surface that is opposed to the inclined portion with the gap part interposed therebetween, and a second inclined surface that is located farther from the medium facing surface than is the first inclined surface;

the first inclined surface has a first end located in the medium facing surface and a second end opposite to the first end, and the first inclined surface is inclined relative to the first and second virtual planes and the medium facing surface such that the second end is located farther from the first and second virtual planes than is the first end;

the second inclined surface has a third end connected to the second end and a fourth end opposite to the third end, and the second inclined surface is inclined relative to the first and second virtual planes and the medium facing surface such that the fourth end is located farther from the first and second virtual planes than is the third end;

an angle that the second inclined surface forms relative to a direction perpendicular to the medium facing surface is greater than an angle that the first inclined surface forms relative to the direction perpendicular to the medium facing surface; and a distance between the main pole and an arbitrary point on the second inclined surface increases with decreasing distance between the arbitrary point and the fourth end.

2. The magnetic head for perpendicular magnetic recording according to claim 1, wherein the angle that the first inclined surface forms relative to the direction perpendicular to the medium facing surface falls within the range of 30° to 45°, and the angle that the second inclined surface forms relative to the direction perpendicular to the medium facing surface falls within the range of 50° to 65°.

3. The magnetic head for perpendicular magnetic recording according to claim 1, wherein:
   the bottom end of the main pole includes the inclined portion; and
   the end face of the write shield further includes a second end face portion that is located on the rear side in the direction of travel of a recording medium relative to the end face of the main pole.

4. The magnetic head for perpendicular magnetic recording according to claim 3, further comprising a return path section made of a magnetic material, wherein:
   the return path section is located on the rear side in the direction of travel of a recording medium relative to the main pole, and connects the write shield and part of the main pole away from the medium facing surface to each other so that a space is defined by the main pole, the gap part, the write shield, and the return path section; and
   the coil includes a portion passing through the space.

5. The magnetic head for perpendicular magnetic recording according to claim 1, wherein the top surface of the main pole includes the inclined portion.

6. The magnetic head for perpendicular magnetic recording according to claim 5, further comprising a return path section made of a magnetic material, wherein:
   the return path section is located on the front side in the direction of travel of a recording medium relative to the main pole, and connects the write shield and part of the main pole away from the medium facing surface to each other so that a space is defined by the main pole, the gap part, the write shield, and the return path section; and
   the coil includes a portion passing through the space.

7. The magnetic head for perpendicular magnetic recording according to claim 1, wherein:
   each of the bottom end and the top surface of the main pole includes the inclined portion; and
   the end face of the write shield further includes a second end face portion that is located on the rear side in the direction of travel of a recording medium relative to the end face of the main pole.

8. The magnetic head for perpendicular magnetic recording according to claim 7, further comprising a first return path section and a second return path section each made of a magnetic material, wherein:
   the first return path section is located on the rear side in the direction of travel of a recording medium relative to the main pole, and connects the write shield and part of the main pole away from the medium facing surface to each other so that a first space is defined by the main pole, the gap part, the write shield, and the first return path section;
   the second return path section is located on the front side in the direction of travel of a recording medium relative to the main pole, and connects the write shield and part of the main pole away from the medium facing surface to each other so that a second space is defined by the main pole, the gap part, the write shield, and the second return path section; and
   the coil includes a first portion passing through the first space and a second portion passing through the second space.

9. The magnetic head for perpendicular magnetic recording according to claim 1, wherein:
   the end face of the write shield further includes a second, a third, and a fourth end face portion;
   the second end face portion is located on the rear side in the direction of travel of a recording medium relative to the end face of the main pole; and
   the third and fourth end face portions are located on opposite sides of the end face of the main pole in a track width direction.

* * * * *